United States Patent
Sakakibara

(10) Patent No.: US 9,450,502 B2
(45) Date of Patent: Sep. 20, 2016

(54) DIRECT POWER CONVERSION DEVICE AND METHOD FOR CONTROLLING DIRECT POWER CONVERSION DEVICE

(71) Applicant: DAIKIN INDUSTRIES, LTD., Osaka-shi, Osaka (JP)

(72) Inventor: Kenichi Sakakibara, Kusatsu (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 0 days.

(21) Appl. No.: 14/434,472

(22) PCT Filed: Oct. 4, 2013

(86) PCT No.: PCT/JP2013/077105
§ 371 (c)(1),
(2) Date: Apr. 9, 2015

(87) PCT Pub. No.: WO2014/057883
PCT Pub. Date: Apr. 17, 2014

(65) Prior Publication Data
US 2015/0280601 A1    Oct. 1, 2015

(30) Foreign Application Priority Data
Oct. 10, 2012    (JP) .................................. 2012-225211

(51) Int. Cl.
*H02M 5/44*    (2006.01)
*H02M 1/15*    (2006.01)
(Continued)

(52) U.S. Cl.
CPC ............... *H02M 5/44* (2013.01); *H02M 1/12* (2013.01); *H02M 1/15* (2013.01); *H02M 5/458* (2013.01);
(Continued)

(58) Field of Classification Search
CPC ...................................................... H02M 5/44
See application file for complete search history.

(56) References Cited

U.S. PATENT DOCUMENTS 5,598,326 A * 1/1997 Liu ..................... H02M 1/4241
                                                363/132
5,771,160 A * 6/1998 Seong ............... H02M 3/33561
                                                363/20
(Continued)

FOREIGN PATENT DOCUMENTS

EP    1484832 A2    12/2004
JP    62-180996 A    8/1987
(Continued)

OTHER PUBLICATIONS

Ohnuma et al., "Basic Investigation and Capacitance Reduction method of a Novel Single-Phase to Three-Phase Power Converter", Papers of Technical Meeting on Semiconductor Power Converter, IEE Japan, SPC-08-162, 2008, pp. 7-12.
(Continued)

*Primary Examiner* — Emily P Pham
(74) *Attorney, Agent, or Firm* — Birch, Stewart, Kolasch & Birch, LLP

(57) ABSTRACT

A first capacitor is provided between a first power supply line and a second power supply line. A charge/discharge circuit includes a second capacitor provided between the first power supply line and the second power supply line and a first switch connected in series to the second capacitor on the side of the first power supply line. A booster circuit boosts the rectified voltage from a diode rectifier to charge the second capacitor. A current blocking part is provided on the first power supply line or the second power supply line between the first capacitor and the second capacitor and blocks flowing of the current from the second capacitor to the first capacitor.

15 Claims, 20 Drawing Sheets

(51) Int. Cl.
    *H02M 5/458*   (2006.01)
    *H02M 1/12*    (2006.01)
    *H02M 7/5395*  (2006.01)
    *H02M 1/00*    (2006.01)
    *H02M 1/42*    (2007.01)
    *H02M 7/48*    (2007.01)

(52) U.S. Cl.
    CPC ......... *H02M 7/5395* (2013.01); *H02M 1/4225* (2013.01); *H02M 7/4826* (2013.01); *H02M 2001/007* (2013.01); *H02M 2001/0022* (2013.01); *Y02B 70/126* (2013.01)

(56) References Cited

U.S. PATENT DOCUMENTS

| | | |
|---|---|---|
| 6,181,583 B1 * | 1/2001 | Okui ............... H02M 1/4208 363/45 |
| 7,633,249 B2 | 12/2009 | Sekimoto et al. |
| 7,907,427 B2 | 3/2011 | Sakakibara et al. |
| 2012/0063178 A1 | 3/2012 | Fujita et al. |

FOREIGN PATENT DOCUMENTS

| JP | 2002-112555 A | 4/2002 |
|---|---|---|
| JP | 2003-18750 A | 1/2003 |
| JP | 3772898 B2 | 5/2006 |
| JP | 4067021 B2 | 3/2008 |
| JP | 4135026 B2 | 8/2008 |
| JP | 2011-15604 A | 1/2011 |
| JP | 2011-50159 A | 3/2011 |
| JP | 2011-125102 A | 6/2011 |
| JP | 2011-193678 A | 9/2011 |

OTHER PUBLICATIONS

Ohnuma et al., "Circuit Configuration and Control Strategy of single-to-three Phase Power Converter with Active Buffer and Charge Circuit", 2010 IEE Japan National Conference, 2010.

Ohnuma et al., Comparison of Boost Chopper and Active Buffer as Single to Three Phase Converter, IEEE ECCE 2011, 2011, pp. 515-521.

Ohnuma et al., "Control Strategy of Single Phase to Three Phase Converter Using an Active Snubber", 2008 IEE Japan Industry Applications Science Conference, 2008.

Ohnuma, "A Control Method for a Single-to-three-phase Power Converter with an Active Buffer and a Charge Circuit," Energy Conversion Congress and Exposition (ECCE), 2010 IEEE, IEEE, Piscataway, NJ, USA, Sep. 12, 2010, ISBN: 978-1-4244-5286-6, pp. 1801-1807.

* cited by examiner

F I G . 6
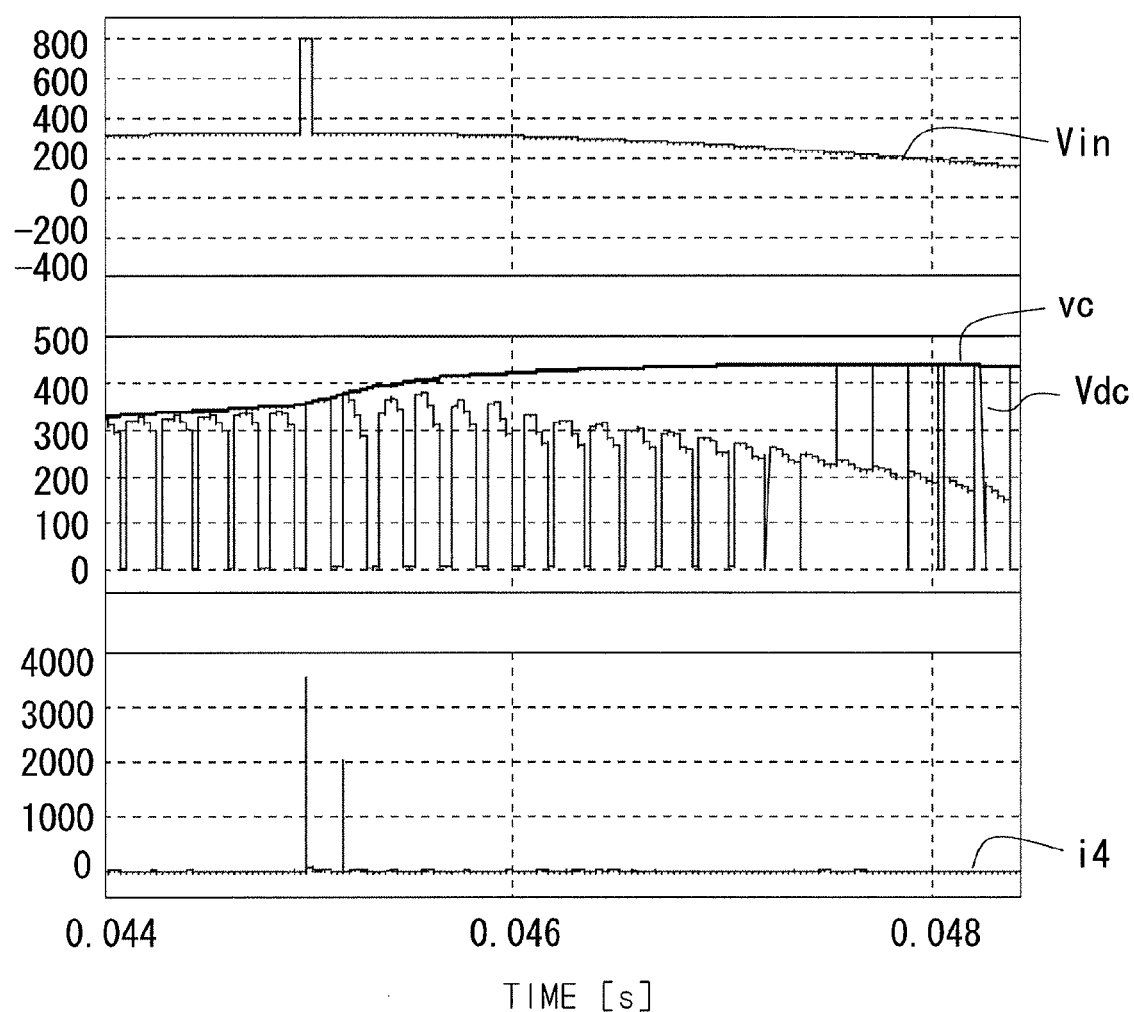

F I G . 1 5
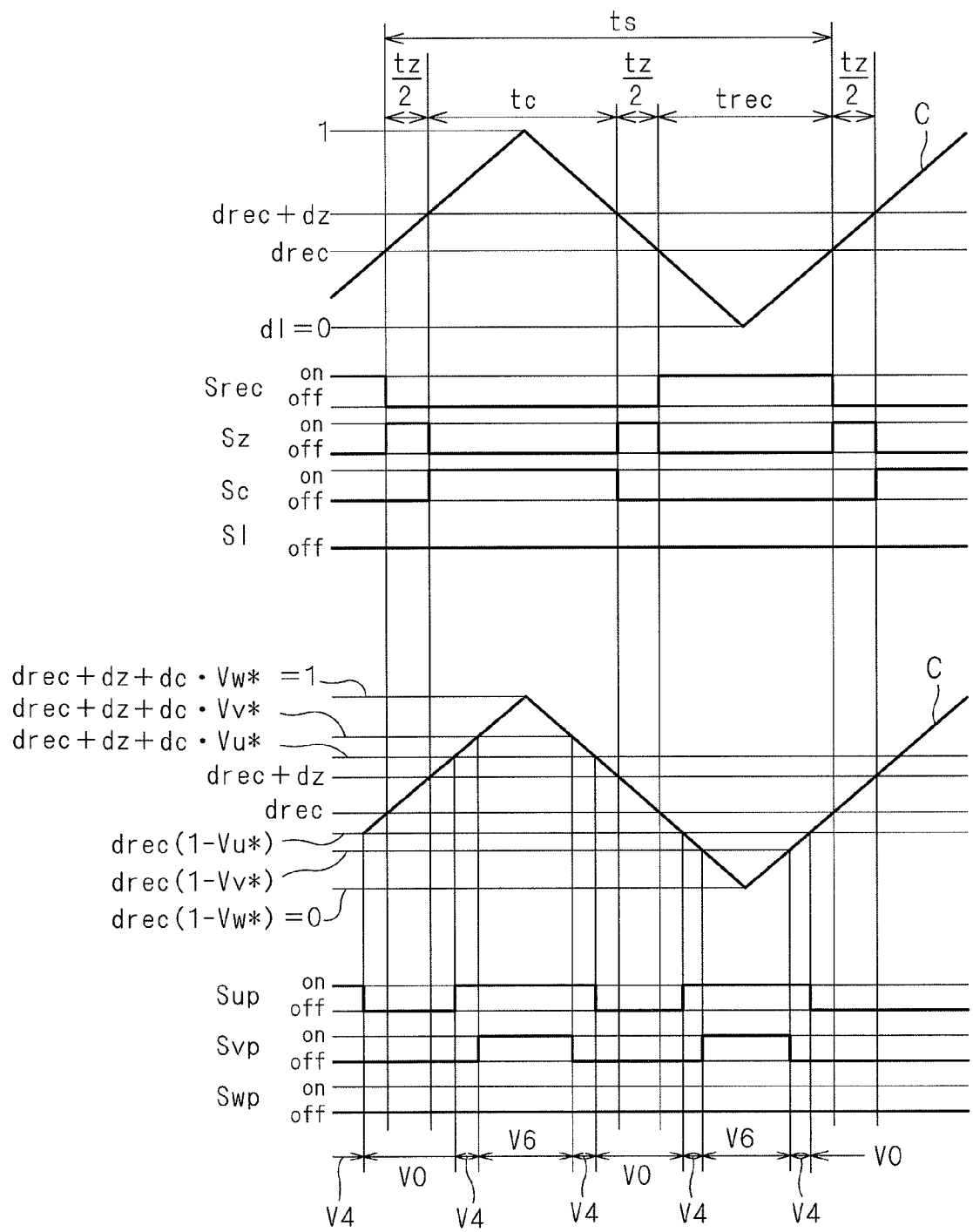

F I G. 20
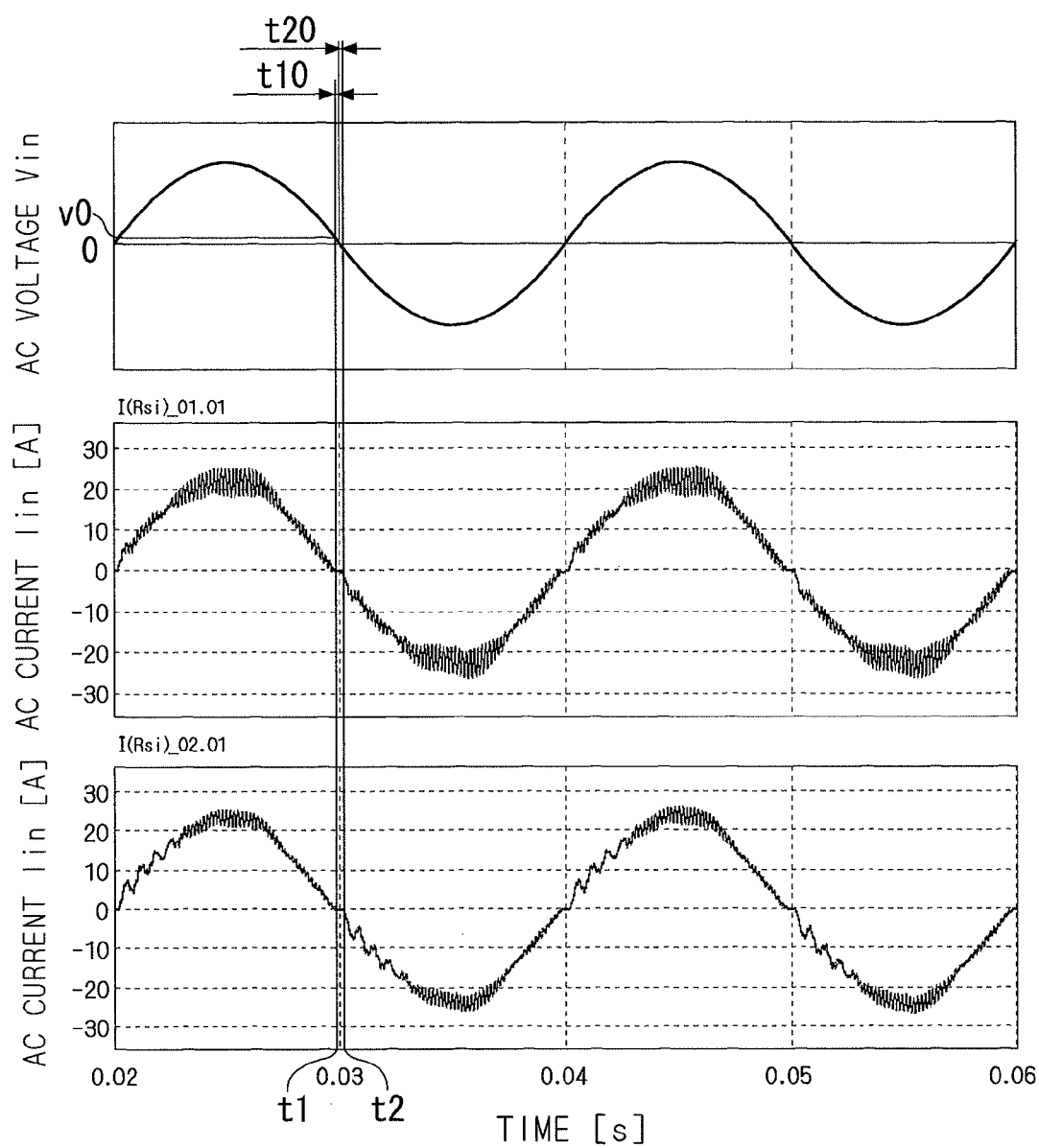

F I G . 2 1
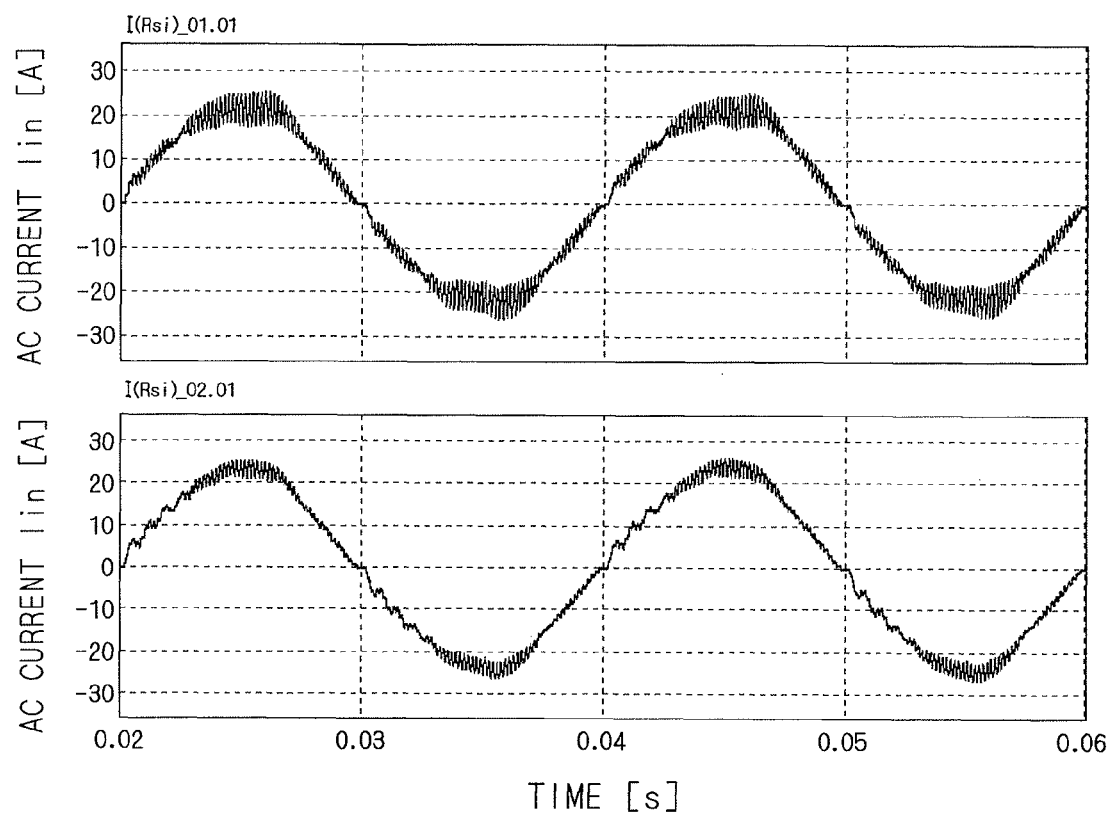

… (1)

DIRECT POWER CONVERSION DEVICE AND METHOD FOR CONTROLLING DIRECT POWER CONVERSION DEVICE

TECHNICAL FIELD

The present disclosure relates to a direct power conversion device and a method for controlling direct power conversion device, and particularly relates to a direct power conversion device provided with a buffer circuit and a booster circuit on a DC link.

BACKGROUND ART

Japanese Patent Application Laid-Open No. 2011-193678 describes a direct power conversion device. The direct power conversion device includes a diode rectifier, an inverter and a charge/discharge circuit. The diode rectifier performs full-wave rectification on a single-phase AC voltage and outputs the voltage to a pair of DC power lines (DC link). The charge/discharge circuit is provided on the DC link, and includes a buffer circuit and a booster circuit. The buffer circuit has a switch and a capacitor that are connected in series to each other between the pair of DC power lines. The switch is located on the positive electrode side of the DC link with respect to the capacitor. The booster circuit boosts the rectified voltage from the diode rectifier to charge the capacitor. Hence the capacitor is charged with a higher voltage than the rectified voltage. Therefore, when the switch of the buffer circuit becomes conductive, this capacitor discharges electricity. The inverter receives an input of a DC voltage of the DC link, converts this to an AC voltage, and outputs the voltage.

Further, in Japanese Patent Application Laid-Open No. 2011-193678, a filter is provided on the input side of the diode rectifier. This filter is a so-called LC filter, provided with a reactor and a capacitor.

It is to be noted that as techniques related to the present disclosure, Japanese Patent No. 4135026, Japanese Patent Application Laid-Open No. 2011-050159, Japanese Patent No. 3772898, Japanese Patent No. 4766181, Japanese Patent No. 4067021, Ohnuma, Itoh, "Basic Investigation and Capacitance Reduction method of A Novel Single-Phase to Three-Phase Power Converter", Papers of Technical Meeting on Semiconductor Power Converter, IEE Japan, SPC-08-162 (2008), Ohnuma, Itoh, "Circuit Configuration and Control Strategy of single-to-three Phase Power Converter with Active Buffer and Charge Circuit", 2010 IEE Japan National Conference, 4-057 (2010), Ohnuma, Itoh, "Control Strategy of Single Phase to Three Phase Converter Using an Active Snubber", 2008 IEE Japan Industry Applications Science Conference, 1-20 (2008) and Yoshiya Ohnuma, Jun-ichi Itoh, "Comparison of Boost Chopper and Active Buffer as Single to Three Phase Converter, IEEE ECCE 2011, pp. 515-521 (2011) are disclosed.

SUMMARY OF INVENTION

Problems to be Solved by the Invention

However, in Japanese Patent Application Laid-Open No. 2011-193678, consideration is not made in terms of a position of the capacitor that forms the filter. Therefore, in order to reduce a rated voltage of the capacitor that forms the filter, there is considered provision of this capacitor not on the input side of the rectifier but on the output side thereof.

The capacitor of the buffer circuit is charged by the booster circuit with a higher voltage than the rectified voltage. Meanwhile, the capacitor of the filter is at the same level of as the rectified voltage. Therefore, when the switch of the buffer circuit becomes conductive, a current flows from the capacitor of the buffer circuit to the capacitor of the filter, to increase a voltage between both ends of the capacitor of the filter.

Accordingly, it is an object of the present disclosure to provide a direct power conversion device capable of preventing an unnecessary increase in voltage across a capacitor that forms a filter even when the capacitor is provided on the output side of a rectifier.

Means for Solving the Problems

A first aspect of a direct power conversion device according to the present disclosure is a direct power conversion device, including: a first power supply line (LH); a second power supply line (LL) applied with a potential lower than that of the first power supply line; a diode rectifier (2) which has an input side connected with a single-phase AC power supply (1) and an output side connected with the first power supply line and the second power supply line, and performs a single-phase full-wave rectification; a first capacitor (C3) provided between the first power supply line and the second power supply line; a charge/discharge circuit (4) provided between the first power supply line and the second power supply line on a side opposite to the diode rectifier with respect to the first capacitor; and an inverter (5) inputted with a DC voltage (Vdc) as a voltage between the first power supply line and the second power supply line, wherein the charge/discharge circuit (4) has a buffer circuit (4a) including a second capacitor (C4) provided between the first power supply line and the second power supply line and a first switch (Sc, D42) connected in series to the second capacitor on a side of the first power supply line between the first power supply line and the second power supply line, a booster circuit (4b) which boosts a rectified voltage from the diode rectifier (2) to charge the second capacitor, and a current blocking part (4c) provided on the first power supply line or the second power supply line between the first capacitor and the second capacitor and blocks flowing of a current from the second capacitor to the first capacitor.

A second aspect of the direct power conversion device according to the present disclosure is the direct power conversion device according to the first aspect, wherein the current blocking part (4c) is a diode (D43).

A third aspect of the direct power conversion device according to the present disclosure is the direct power conversion device according to the second aspect, wherein the booster circuit (4b) includes a second diode (D40) provided with an anode and a cathode connected between the first switch (Sc, D42) and the second capacitor (C4), a reactor (L4) connected between the first power supply line (LH) and the anode, and a second switch (S1, D41) connected between the second power supply line (LL) and the anode, and the diode (D43) is provided on the first power supply line (LH) between the buffer circuit (4a) and the booster circuit (4b).

A fourth aspect of the direct power conversion device according to the present disclosure is the direct power conversion device according to any one of the first to third aspects, the device further including a second reactor (L3) provided on the first power supply line (LH) or the second power supply line (LL) between the first capacitor (C3) and the diode rectifier (2).

A fifth aspect of the direct power conversion device according to the present disclosure is the direct power conversion device according to any one of the first to third aspects, the device further including a second reactor (L3) provided on the input side of the diode rectifier (2).

A sixth aspect of the direct power conversion device according to the present disclosure is the direct power conversion device according to the fourth or fifth aspect, the device further including a damping resistor (R3) connected in parallel to the second reactor (L3).

A first aspect of a method for controlling the direct power conversion device according to the present disclosure is a method for controlling the direct power conversion device according to any one of the fourth to sixth aspects, the method including: detecting a voltage (VL) of the second reactor (L3); generating a rectification duty (drec') as a time ratio where the diode rectifier (2) is conducted; correcting the rectification duty so as to be reduced more as the voltage is larger, to generate a post-correction rectification duty (drec); and controlling a zero-phase current of the inverter (5) by use of a zero duty (dz) as a time ratio that is set based on the post-correction rectification duty and a discharge duty (dc) as a time ratio where the first switch (Sc, D42) is conducted.

A second aspect of the method for controlling the direct power conversion device according to the present disclosure is the method for controlling the direct power conversion device according to the first aspect, wherein the rectification duty (drec') is corrected only in a first period (T1) when a cosine value ($\cos(2\omega t)$) with respect to a value ($2\omega t$) twice as large as a phase angle ($\omega t$) of an AC waveform outputted by the single-phase AC power supply (1, 2) under grasping the AC waveform as a sine value of the phase angle ($\omega t$).

Effects of the Invention

According to the first aspect of the direct power conversion device of the present disclosure, the second capacitor is charged by the booster circuit with a higher voltage than the rectified voltage. Meanwhile, the voltage of the first capacitor is at the same level as the rectified voltage. Accordingly, the current blocking part blocks flowing of a current from the second capacitor to the first capacitor. It is thus possible to hold the voltage of the first capacitor at the same level as the rectified voltage. Hence it is possible to prevent an unnecessary increase in voltage of the first capacitor.

According to the second aspect of the direct power conversion device of the present disclosure, it is possible to reduce the degree to which a current flowing in the current blocking part increases in accordance with instantaneous variation of the single-phase AC power supply.

According to the third aspect of the direct power conversion device of the present disclosure, since there is no diode existing in a channel of the booster circuit, it is possible to charge the second capacitor as avoiding a loss due to the diode.

According to the fourth aspect of the direct power conversion device of the present disclosure, the first capacitor and the second reactor can cooperate with each other to form a so-called LC filter.

According to the fifth aspect of the direct power conversion device of the present disclosure, the first capacitor and the second reactor can cooperate with each other to form a so-called LC filter.

According to the sixth aspect of the direct power conversion device of the present disclosure, a waveform of an input current can be adjusted by adjusting a resistance value of the damping resistor.

According to the first aspect of the method for controlling the direct power conversion device of the present disclosure, it is possible to suppress variation in input current that is inputted into the diode rectifier.

According to the second aspect of the method for controlling the direct power conversion device of the present disclosure, the input current that is inputted into the diode rectifier varies with a relatively large variation width in the first period, and the variation width is smaller in a second period different from the first period, as described later. Hence it is possible to reduce the number of control processes while suppressing the variation in input current.

The object, characteristics, aspects and advantages of the present disclosure will become more apparent by means of the following detailed descriptions and the attached drawings.

BRIEF DESCRIPTION OF DRAWINGS

FIG. 6 is an enlarged diagram of the graph of FIG. 5;

FIG. 15 is a timing chart explaining an operation of the direct power conversion device in a giving period;

FIG. 20 is a diagram showing one example of the single-phase AC voltage and the input currents; and FIG. 21 is a diagram showing one example of the input currents.

DESCRIPTION OF EMBODIMENTS

First Embodiment

<Configuration of Direct Power Conversion Device>

Figure 1:
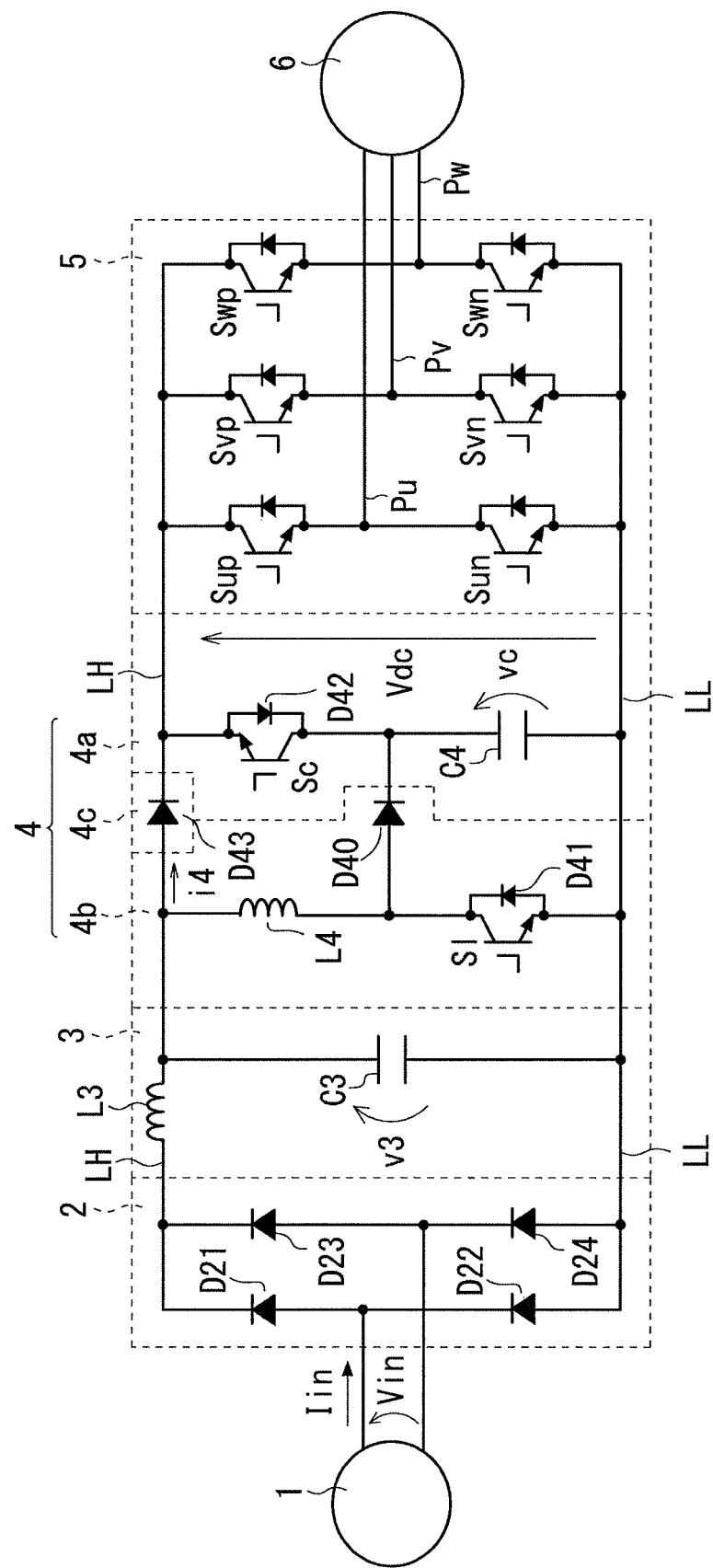
FIG. 1 is a constitutional diagram showing one example of a conceptual configuration of a direct power conversion device.

As shown in FIG. 1, the present direct power conversion device is provided with a diode rectifier 2, a filter 3, a charge/discharge circuit 4, and an inverter 5.

The diode rectifier 2 is connected with a single-phase AC power supply 1, and provided with diodes D21 to D24. The diodes D21 to D24 constitute a bridge circuit, which performs single-phase full-wave rectification on a single-phase AC voltage Vin inputted from the single-phase AC power supply 1 to convert it to a rectified voltage, and outputs this between DC power lines LH and LL. The DC power line LH is applied with a higher voltage than that of the DC power line LL. An input current Iin flows from the single-phase AC power supply 1 into the diode rectifier 2.

The filter 3 is provided with a reactor L3 and a capacitor C3. The capacitor C3 is provided between the DC power lines LH and LL. The reactor L3 is provided on the DC power line LH or the DC power line LL (the DC power line LH in the illustration of FIG. 1) on the side closer to the diode rectifier 2 than the capacitor C3. The reactor L3 and the capacitor C3 cooperate with each other to form a so-called LC filter.

The capacitor C3 is, for example, a film capacitor and has a small capacitance as compared to a capacitance of an electrolytic capacitor. Such a capacitor C3 hardly smoothes the rectified voltage outputted by the diode rectifier 2. Hence a voltage v3 between both ends of the capacitor C3 ripples in the same cycle as a cycle of a ripple of the rectified voltage.

Figure 2:
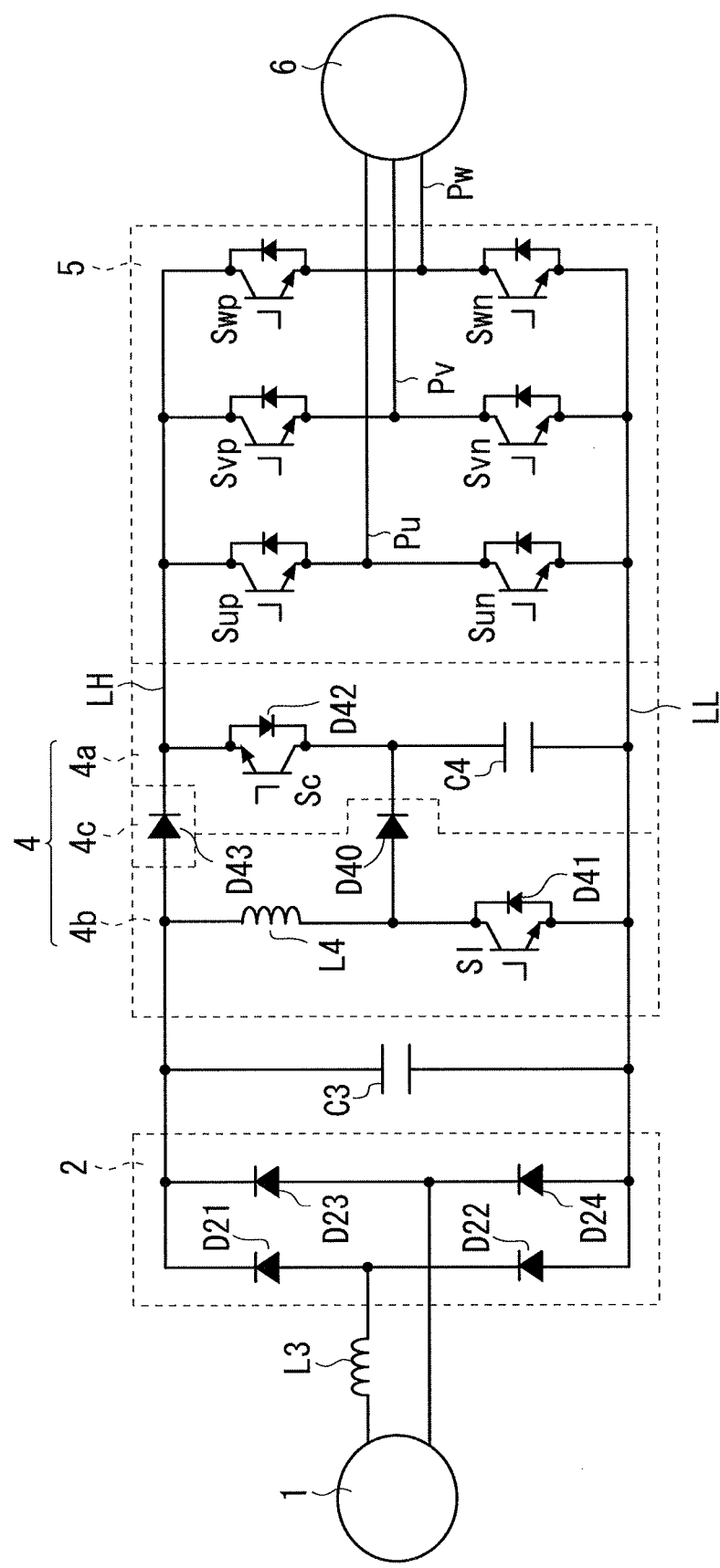
FIG. 2 is a constitutional diagram showing one example of the conceptual configuration of the direct power conversion device.

In addition, although the reactor L3 is provided on the output side of the diode rectifier 2 in the illustration of FIG. 1, it may be provided on the input side of the diode rectifier 2 as illustrated in FIG. 2. In FIG. 2, the reactor L3 is provided on an input line that connects between the diode rectifier 2 and the single-phase AC power supply 1. Such a reactor L3 can also form the LC filter along with the capacitor C3.

The charge/discharge circuit 4 is provided on a side opposite to the diode rectifier 2 with respect to the capacitor C3, and has a buffer circuit 4a, a booster circuit 4b and a current blocking part 4c. The buffer circuit 4a includes a capacitor C4, and power is transferred between the buffer circuit 4 and the DC power lines LH and LL.

The buffer circuit 4a further includes a transistor (here, an insulating gate-type bipolar transistor: hereinafter abbreviated to "IGBT") Sc which is reverse-parallel connected with a diode D42. The transistor Sc is connected in series to the capacitor C4 on the side of the DC power line LH between the DC power lines LH and LL. Here, the reverse parallel connection means such parallel connection in which forward directions reverse to each other. Specifically, a forward direction of the transistor Sc is a direction from the DC power line LL toward the DC power line LH, and a forward direction of the diode D42 is a direction from the DC power line LH toward the DC power line LL. It is possible to grasp the transistor Sc and the diode D42 together as one switch element (first switch).

The booster circuit 4b boosts the rectified voltage from the diode rectifier 2 (more specifically, the voltage v3 between both ends of the capacitor C3), to charge the capacitor C4. For example, the booster circuit 4b includes a diode D40, a reactor L4 and a transistor (here, IGBT) S1. The diode D40 is provided with a cathode and an anode, and the cathode is connected between the first switch and the capacitor C4. The reactor L4 is connected between the DC power line LH and the anode of the diode D40. The transistor S1 is connected between the DC power line LL and the anode of the diode D40. A diode D41 is reverse-parallel connected to the transistor S1, and these can be grasped together as one switch element (second switch). Such a configuration is known as a boost chopper.

The capacitor C4 is charged by the booster circuit 4b to generate a voltage vc between both ends which is higher than the voltage v3 between both ends. Specifically, by allowing a current to flow from the DC power line LH to the DC power line LL via the second switch, energy is stored into the reactor L4, and by subsequently turning off the second switch, the energy is stored into the capacitor C4 via the diode D40.

Since the voltage vc between both ends is higher than the voltage v3 between both ends, no current basically flows in the diode D42. Hence conduction/non-conduction of the first switch depends entirely on that of the transistor Sc. Therefore, not only the transistor Sc but also the first switch formed of this and the diode D42 together may be hereinafter referred to as a switch Sc.

Further, since a potential of the DC power line LH is higher than that of the DC power line LL, no current basically flows in the diode D41. Hence conduction/non-conduction of the second switch depends on that of the transistor S1. Therefore, not only the transistor S1 but also the second switch formed of this and the diode D41 together may be hereinafter referred to as a switch S1.

The current blocking part 4c is provided on the DC power line LH or the DC power line LL between the capacitors C3 and C4, to block a current flowing from the capacitor C4 to the capacitor C3. The current blocking part 4c is realized in a diode D43, for example. In the illustration of FIG. 1, the diode D43 is provided on the DC power line LH, and its forward direction is a direction from the diode rectifier 2 toward the inverter 5.

Such a charge/discharge circuit 4 outputs almost the same voltage as the voltage v3 between both ends of the capacitor C3 when the switch Sc is non-conductive, and it outputs almost the same voltage as the voltage Vc between both ends of the capacitor C4 when the switch Sc is conductive.

The inverter 5 converts a DC voltage outputted by the charge/discharge circuit 4 to an AC voltage, and outputs this to output ends Pu, Pv, Pw. The inverter 5 includes six switching elements Sup, Svp, Swp, Sun, Svn, Swn. The switching elements Sup, Svp, Swp are respectively connected between the output ends Pu, Pv, Pw and the DC power line LH, and the switching elements Sun, Svn, Swn are respectively connected between the output ends Pu, Pv, Pw and the DC power line LL. The inverter 5 constitutes a so-called voltage-type inverter, and includes six diodes Dup, Dvp, Dwp, Dun, Dvn, Dwn.

A cathode of any of the diodes Dup, Dvp, Dwp, Dun, Dvn, Dwn is arranged toward the side of the DC power line LH, and an anode thereof is arranged toward the side of the DC power line LL. The diode Dup is connected in parallel to the switching element Sup between the output end Pu and the DC power line LH. Similarly, the diodes Dvp, Dwp, Dun, Dvn, Dwn are respectively connected in parallel to the switching elements Svp, Swp, Sun, Svn, Swn.

For example, an IGBT (Insulating Gate-type Bipolar Transistor) is employed to each of the switching elements Sup, Svp, Swp, Sun, Svn, Swn.

An inductive load 6 is, for example, a rotator and rotates in accordance with the AC voltage from the inverter 5.

According to such a direct power conversion device, the voltage vc between both ends of the capacitor C4 becomes larger than the voltage v3 between both ends of the capacitor C3 due to the booster circuit 4b. Therefore, assuming that the current blocking part 4c is not provided, when the switch Sc becomes conductive, the current flows from the capacitor C4 to the capacitor C3. This leads to an unnecessary increase in voltage v3 between both ends of the capacitor C3.

On the other hand, in the present direct power conversion device, the current blocking part 4c blocks flowing of the current from the capacitor C4 to the capacitor C3. Hence it is possible to avoid the unnecessary increase in voltage v3 between both ends of the capacitor C3.

Further, since the increase in voltage v3 between both ends can be avoided, the voltage v3 between both ends can be made at the same level as the voltage rectified by the diode rectifier 2. Accordingly, for example when the switch Sc becomes non-conductive and the current flows from the converter (the diode rectifier 2 and the filter 3) to the inverter 5, the voltage v3 between both ends at the same level as the rectified voltage can be inputted into the inverter 5.

On the other hand, the control in Japanese Patent Application Laid-Open No. 2011-193678 is control based on the idea that the rectified voltage is inputted into the inverter 5 when the current flows from the converter to the inverter 5, as described in detail later. As described above, according to the present direct power conversion device, since the voltage v3 between both ends at the same level as the rectified voltage can be inputted into the inverter 5 at that time, the present direct power conversion device is suitable for the control in Japanese Patent Application Laid-Open No. 2011-193678.

As described above, according to the present direct power conversion device, it is possible to reduce a rated voltage of the capacitor C3 as compared to the case of providing the capacitor on the input side of the diode rectifier 2, and moreover, the present direct power conversion device is suitable for the control (e.g., the control in Japanese Patent Application Laid-Open No. 2011-193678) on the premise of the idea that the rectified voltage is inputted into the inverter 5 when the current flows from the converter (diode rectifier 2+filter 3) to the inverter 5.

<Position of Current Blocking Part>

Figure 3:
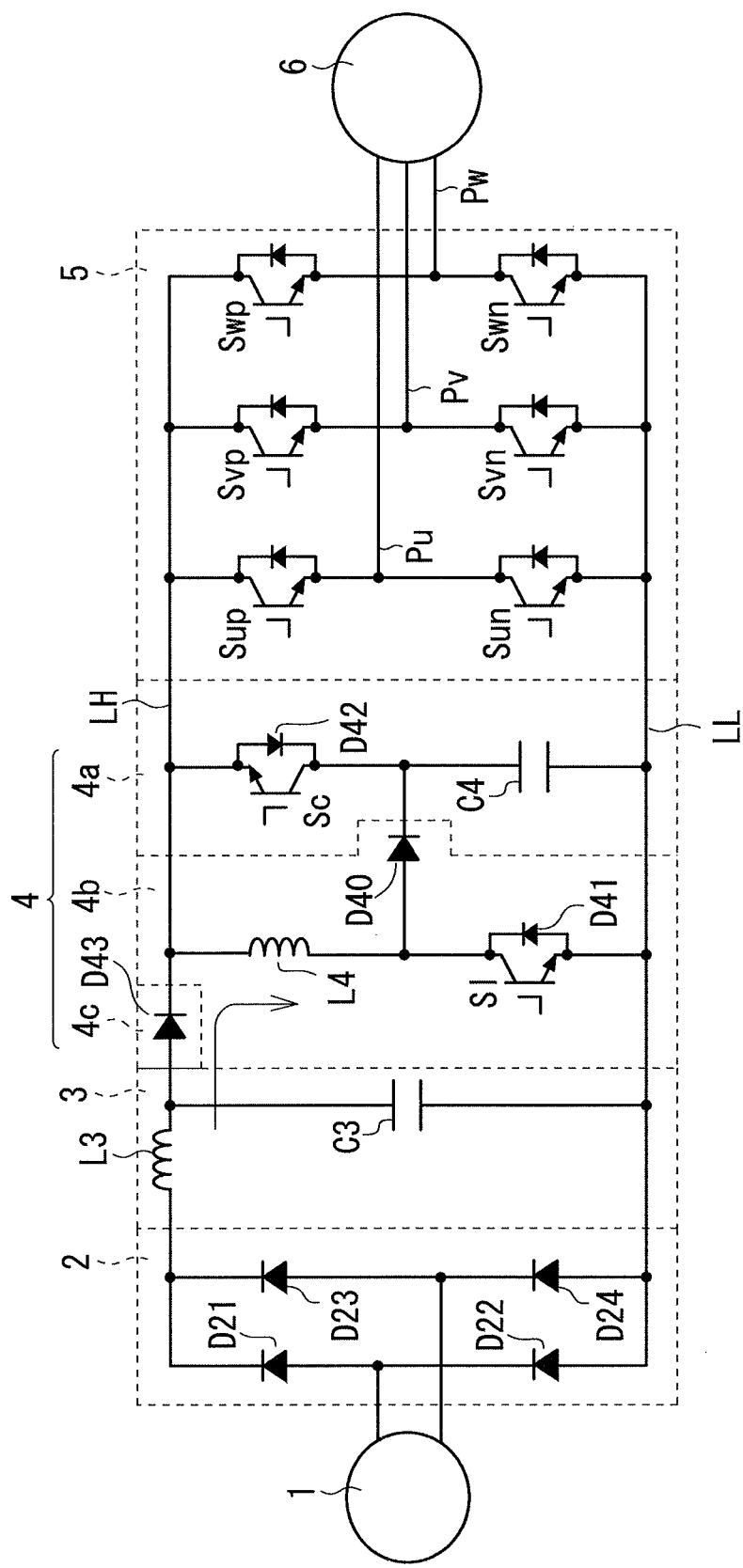
FIG. 3 is a constitutional diagram showing one example of the conceptual configuration of the direct power conversion device.

In the illustrations of FIGS. 1 and 2, the diode D43 is provided on the DC power line LH between the buffer circuit 4a and the booster circuit 4b. This is desirable in terms of reducing a loss that is generated in the diode D43. For example, when the diode D43 is provided on the DC power line LH at a prior stage to the booster circuit 4b as in FIG. 3, a current flowing to the booster circuit 4b (i.e., a current flowing in the reactor L4, indicated by an arrow in FIG. 3) passes through the diode D43. On the other hand, in the illustrations of FIGS. 1 and 2, the current flowing in the booster circuit 4b does not pass through the diode D43. Hence it is possible to reduce the loss that is generated in the diode D43. In other words, it is possible to charge the capacitor C4 as avoiding the loss due to the diode D43.

<Current Blocking Part>

Figure 4:
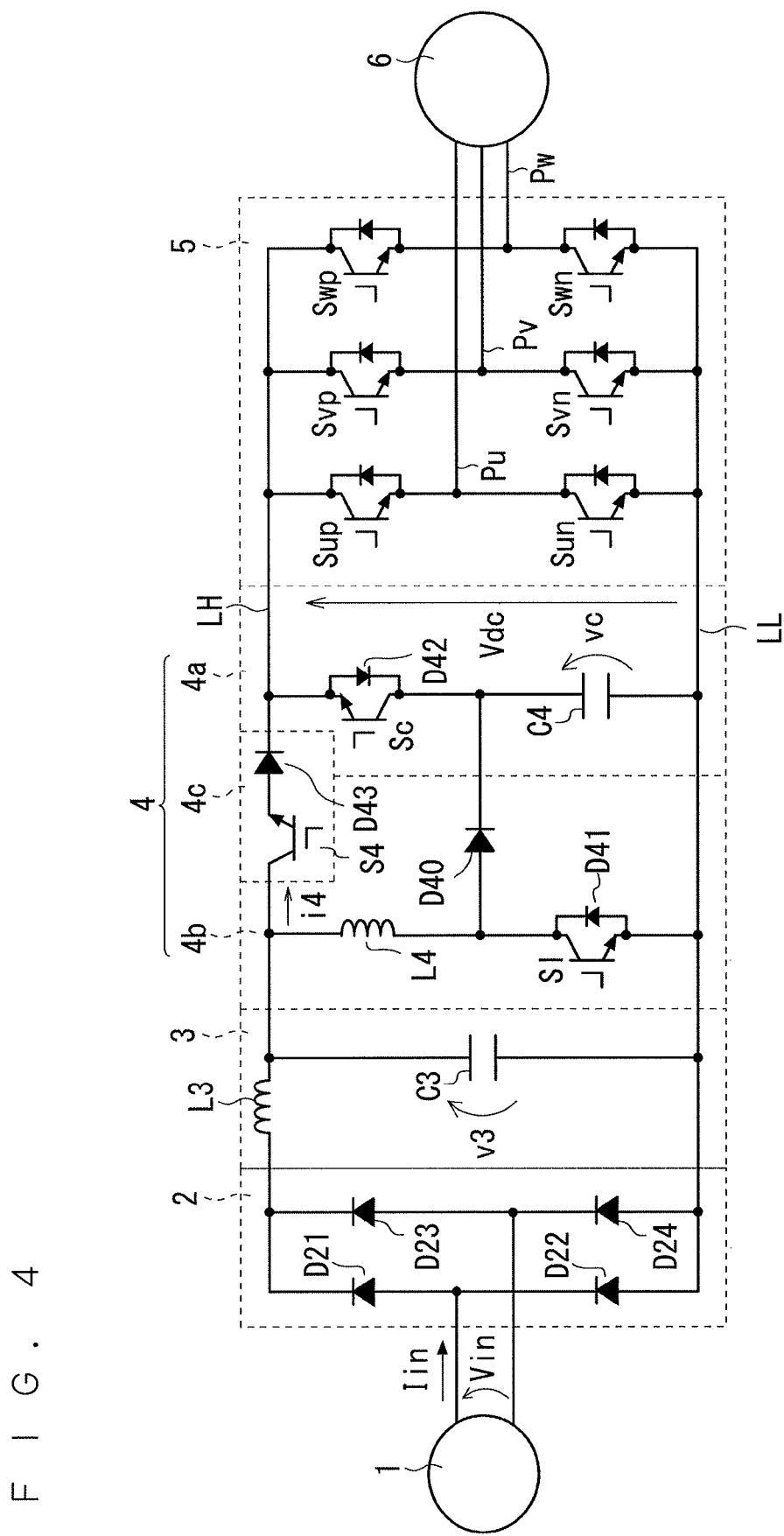
FIG. 4 is a constitutional diagram showing one example of the conceptual configuration of the direct power conversion device.

In an illustration of FIG. 4, the current blocking part 4c is provided with the diode D43 and a switch S4. The diode D43 and the switch S4 are provided on the DC power line LH between the buffer circuit 4a and the booster circuit 4b, and connected in series to each other. A forward direction of the diode D43 is a direction from the diode rectifier 2 toward the inverter 5. The switch S4 is, for example, an IGBT and its forward direction is the same as that of the diode D43.

It is to be noted that, although the diode D43 is provided in the illustration of FIG. 4, the diode D43 may not be provided. In this case, the switch S4 is made conductive exclusively from the switch Sc. Hence it is possible to block the current flowing from the capacitor C4 to the capacitor C3 even without the diode D43 being provided.

On the other hand, it is desirable to provide the diode D43 in terms of reducing a reverse voltage that is applied to the switch S4. The reverse voltage mentioned here is a voltage in a reverse direction to the voltage that is applied to the switch S4 when the current flows in the forward direction, and is a voltage with a higher potential at the end on the side of the capacitor C4 out of both ends of the switch S4. When the diode D43 is provided, a serially connected body of the diode D43 and the switch S4 supports the reverse voltage that is applied to the current blocking part 4c, thereby allowing reduction in reverse voltage that is applied to the switch S4.

Further, this current blocking part 4c enables the converter (diode rectifier 2+filter 3) to function as a current source converter. This is because the current blocking part 4c has a so-called reverse blockage ability since having the diode D43, and further has the switch S4.

Such a current blocking part 4c can also block flowing of the current from the capacitor C4 to the capacitor C3. However, the current blocking part 4c desirably has the diode D43 alone in the following terms. That is, as described in detail below, when an instantaneous voltage rise is generated in the single-phase AC voltage Vin, a current flows in the current blocking part 4c, and in terms of magnitude of this current, the current blocking part 4c desirably has the diode D43 alone.

Figure 5:
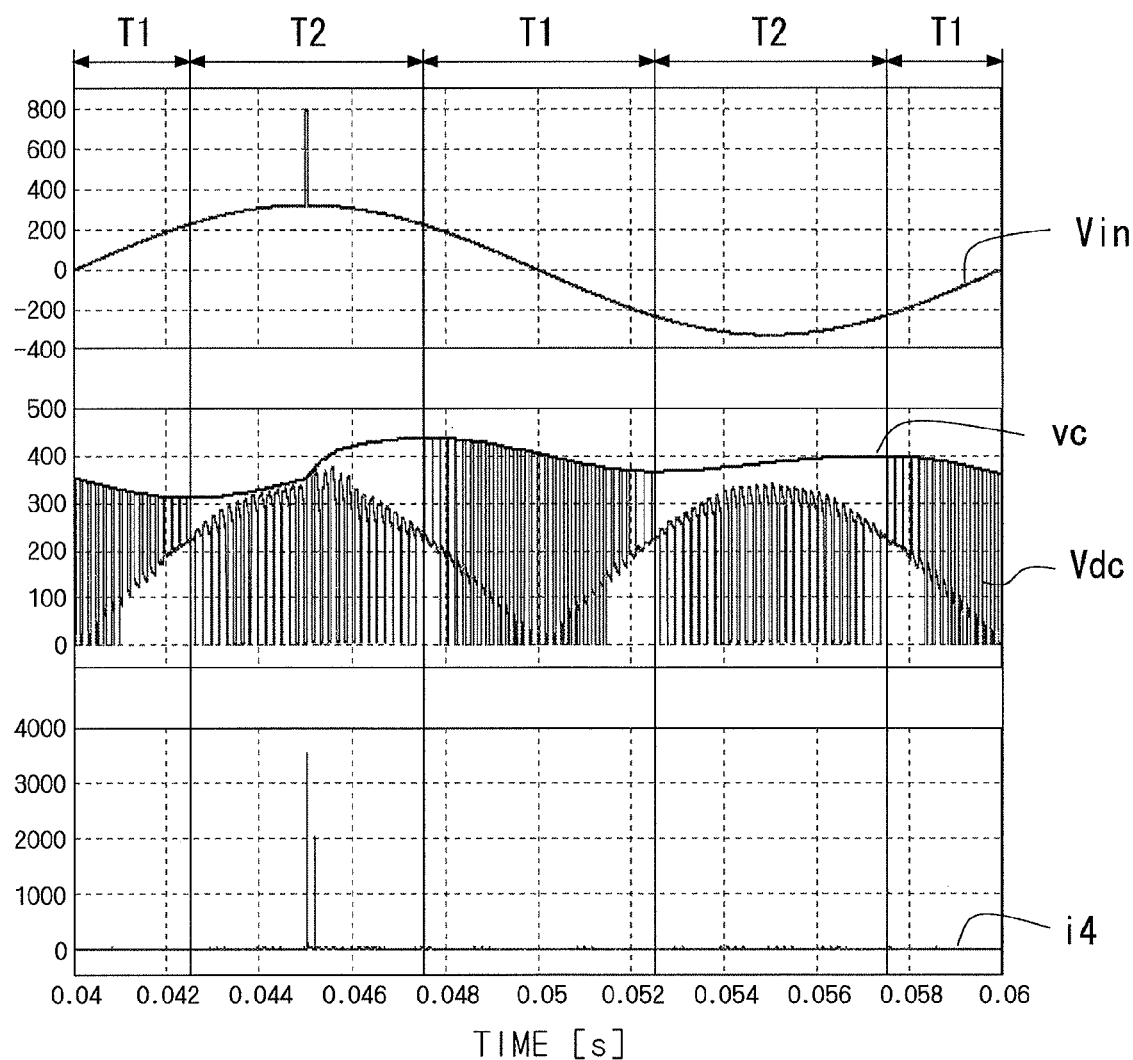
FIG. 5 is a diagram showing one example of quantities in the direct power conversion device.
Figure 7:
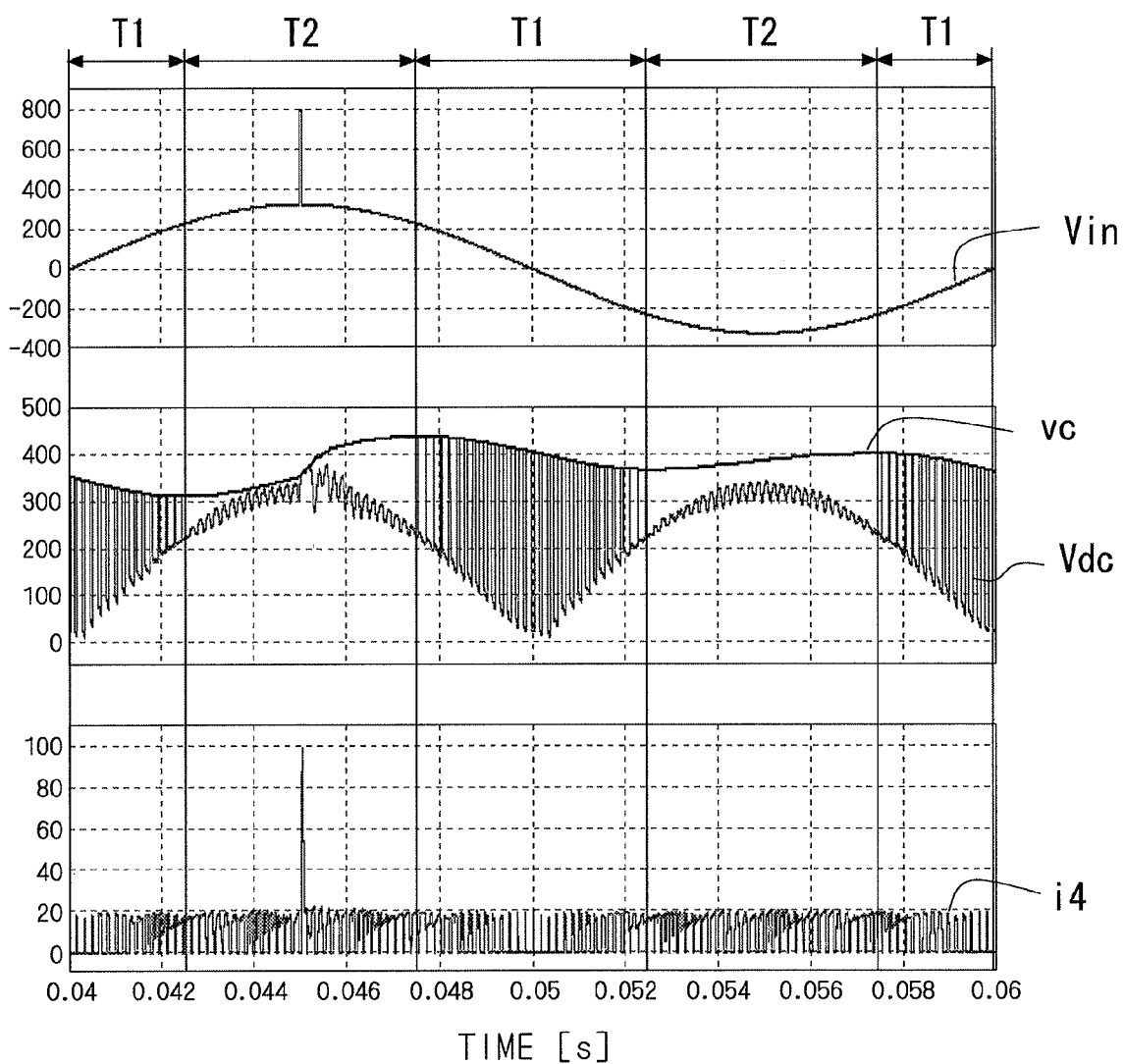
FIG. 7 is a diagram showing one example of quantities in the direct power conversion device.
Figure 8:
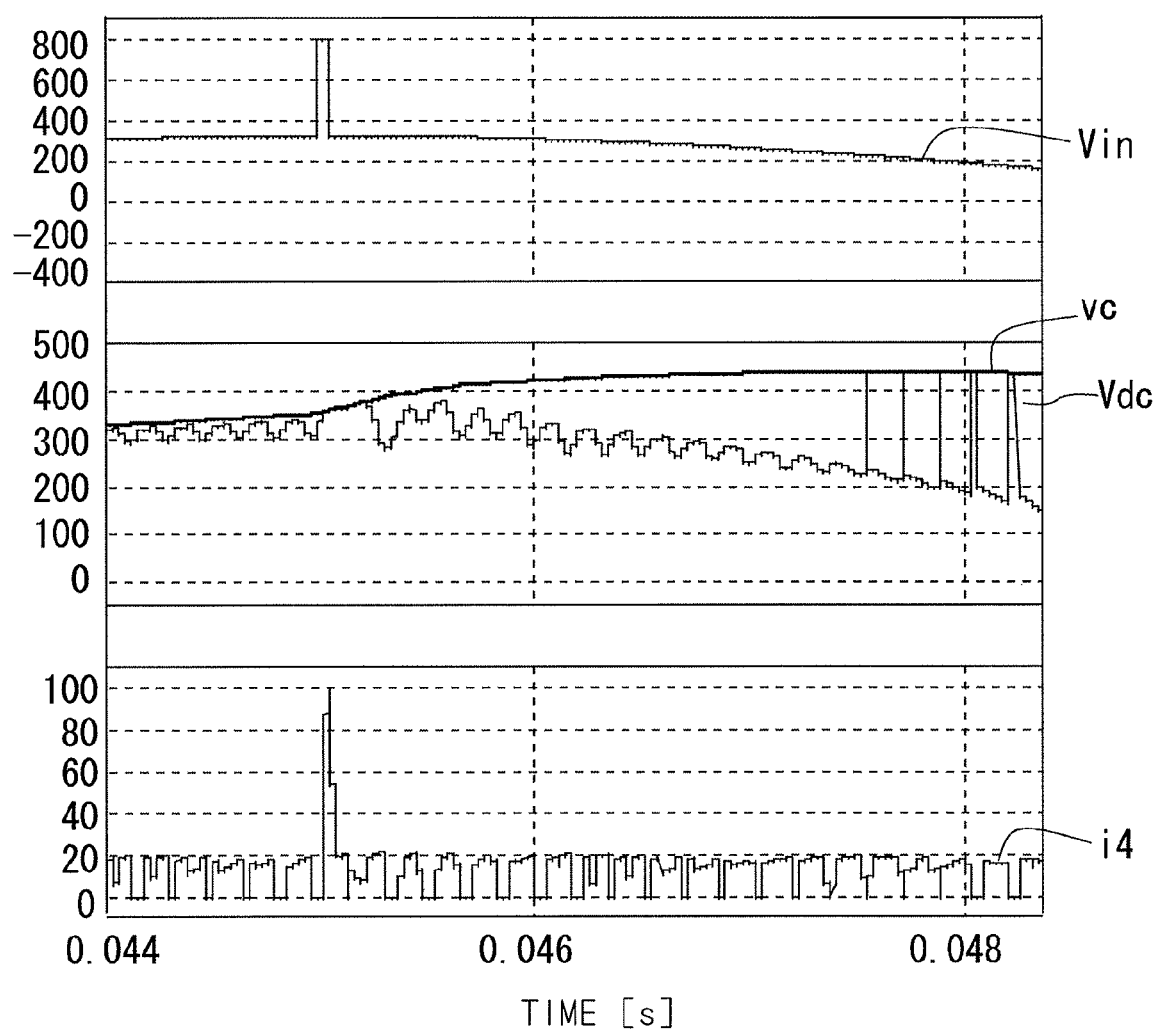
FIG. 8 is an enlarged diagram of the graph of FIG. 7.

FIG. 5 shows AC voltage Vin, a DC voltage Vdc that is inputted into the inverter 5, the voltage vc between both ends of the capacitor C4 and a current i4 flowing in the current blocking part 4c when generation of the instantaneous voltage rises in the single-phase AC voltage Vin from the single-phase AC power supply 1 in the direct power conversion device of FIG. 4, and FIG. 6 is an enlarged diagram of FIG. 5. FIG. 7 shows the single-phase AC voltage Vin, the DC voltage Vdc, the voltage vc between both ends and the current i4 when generation of the instantaneous voltage rises in the AC voltage Vin in the direct power conversion device of FIG. 1, and FIG. 8 is an enlarged diagram of FIG. 7.

Here, an amplitude of the single-phase AC voltage Vin is on the order of about 325 [V], and mainly takes a sine wave shape. However, in the illustrations of FIGS. 5 to 8, a pulse shaped like a lighting surge is applied to this single-phase AC voltage Vin. For example, a pulse with a pulse width of 50 [μsec] is applied to the vicinity of the peak of the amplitude of the single-phase AC voltage Vin, and the single-phase AC voltage Vin thereby rises to a voltage value of 800 [V] at a maximum.

In FIG. 5, the DC voltage Vdc takes the voltage vc between both ends, the voltage v3 between both ends (the same level as the rectified voltage), or zero. It is to be noted that the voltage v3 between both ends is at the same level as the rectified voltage, and ideally has a waveform along an absolute value of the sine wave shown by the single-phase AC voltage Vin.

Which value the DC voltage Vdc takes can be described in association with conduction/non-conduction of the switches Sc, S4. That is, also with reference to FIG. 4, the voltage vc between both ends is inputted into the inverter 5 in a period when the switch Sc is conductive, and hence the DC voltage Vdc takes the voltage vc between both ends. In a period when the switch Sc is non-conductive and the switch S4 is conductive, the voltage v3 between both ends of the capacitor C3 is inputted into the inverter 5, and hence the DC voltage Vdc takes the voltage v3 between both ends. In a period when both the switches Sc, S4 are non-conductive, the DC voltage Vdc takes zero.

Further, in the present embodiment, the voltage vc between both ends is rippling. More specifically, the voltage vc between both ends decreases in a period T1 (each of periods when power supply phase angles are 0 to 45 degrees, 135 to 225 degrees and 315 to 360 degrees when the single-phase AC voltage Vin is regarded as the sine wave). This is because in the period T1, the switch Sc is appropriately turned on and the capacitor C4 is appropriately discharged. On the other hand, in a period T2 other than the period T1, the voltage vc between both ends increases. This is because in the period T2, the booster circuit 4b (switch S1) is operated while the switch Sc is held non-conductive, to charge the capacitor C4. However, in FIG. 5, the instantaneous voltage rise has been generated in the single-phase AC voltage Vin, and this causes an increase in voltage vc between both ends. A description in this regard will be given later.

As described above, the voltage vc between both ends decreases in the period T1 and rises in the period T2. That is, the voltage vc between both ends ripples in a cycle that is half of a cycle of the single-phase AC voltage Vin. However, the voltage vc between both ends may be almost constant.

When the instantaneous voltage rise is generated in the AC voltage Vin as illustrated in FIGS. 5 and 6, in association with this, the voltage v3 between both ends of the capacitor C3 increases. When the switch S4 is non-conductive in this case, the capacitor C4 is charged via the reactors L3, L4 and the diode D40. Accordingly, the reactor L3 further stands in a charge channel of the capacitor C4 as compared to a charging channel of the capacitor C3, and hence the rise of the voltage vc between both ends is gentle as compared to the rise of the voltage v3 between both ends. In this case, therefore, the voltage v3 between both ends can increase, exceeding the voltage vc between both ends.

As thus described, when the switch S4 becomes conductive in the state of the voltage vc between both ends being higher than the voltage v3 between both ends, a relatively large current (so-called inrush current) flows from the capacitor C3 to the capacitor C4 via the switch S4 and the diodes D42, D43. This is because the switch S4 and the diodes D42, D43 which stand in this channel do not greatly suppress the current in the channel. In the illustrations of FIGS. 5 and 6, the current i4 flowing in the current blocking part 4c exceeds 3000 [A] at a maximum. In this case, the DC voltage Vdc takes the voltage v3 between both ends since the voltage v3 between both ends is inputted into the inverter 5, and the voltage v3 between both ends becomes almost equal to the voltage Vc between both ends, whereby the DC voltage Vdc that is inputted into the inverter 5 becomes almost equal to the voltage vc between both ends, as shown in FIGS. 5 and 6.

Then, when the switch S4 becomes non-conductive again, the voltage v3 between both ends can become higher than the voltage vc between both ends again. When the switch S4 becomes conductive again in this state, a large current flows in the current blocking part 4c again. In the illustrations of FIGS. 5 and 6, also in the case of the switch S4 becoming conductive for the second time, a large current i4 flows due to generation of the instantaneous voltage rise.

On the other hand, in the illustrations of FIGS. 7 and 8, the DC voltage Vdc does not take zero. This is because the switch S4 is not provided in the direct power conversion device of FIG. 1. Also in the direct power conversion device of FIG. 1, the voltage v3 between both ends increases due to the instantaneous voltage rise in the single-phase AC voltage Vin. When the output voltage of the diode rectifier 2 then increases and the diodes D42, D43 become conductive, a current flows not from the capacitor C3 but from the diode rectifier 2 to the capacitor C4 via the current blocking part 4c and the diode D42. With the reactor L3 standing in this channel, an increase rate of the current i4 with respect to the time can be suppressed. The peak of the current i4 can thus be suppressed. In this case, the current i4 varies along a saw tooth wave, and its maximum value is not larger than the order of 100 [A] in the illustrations of FIGS. 7 and 8.

As described above, according to the direct power conversion device of FIG. 1, the peak of the current i4 flowing in the current blocking part 4c can be made about 1/30 as compared to the direct power conversion device of FIG. 4. Hence it is possible to adopt a diode with a small current capacity as the diode D43.

It should to be noted that in the illustrations of FIGS. 7 and 8, the maximum value of the current i4 in a steady state is on the order of 20 [A]. Hence the peak (about 100 [A]) of the current i4 in association with the instantaneous voltage rise is on the order of five times as large as the current i4 in the steady state. Since a surge current proof strength of a diode is generally ten times as large as or larger than a rated value, when a rated current of the diode D43 is selected to the same level as a rated current of the inverter 5, the diode D43 can withstand the peak of the current due to the instantaneous voltage rise.

Second Embodiment

Figure 9:
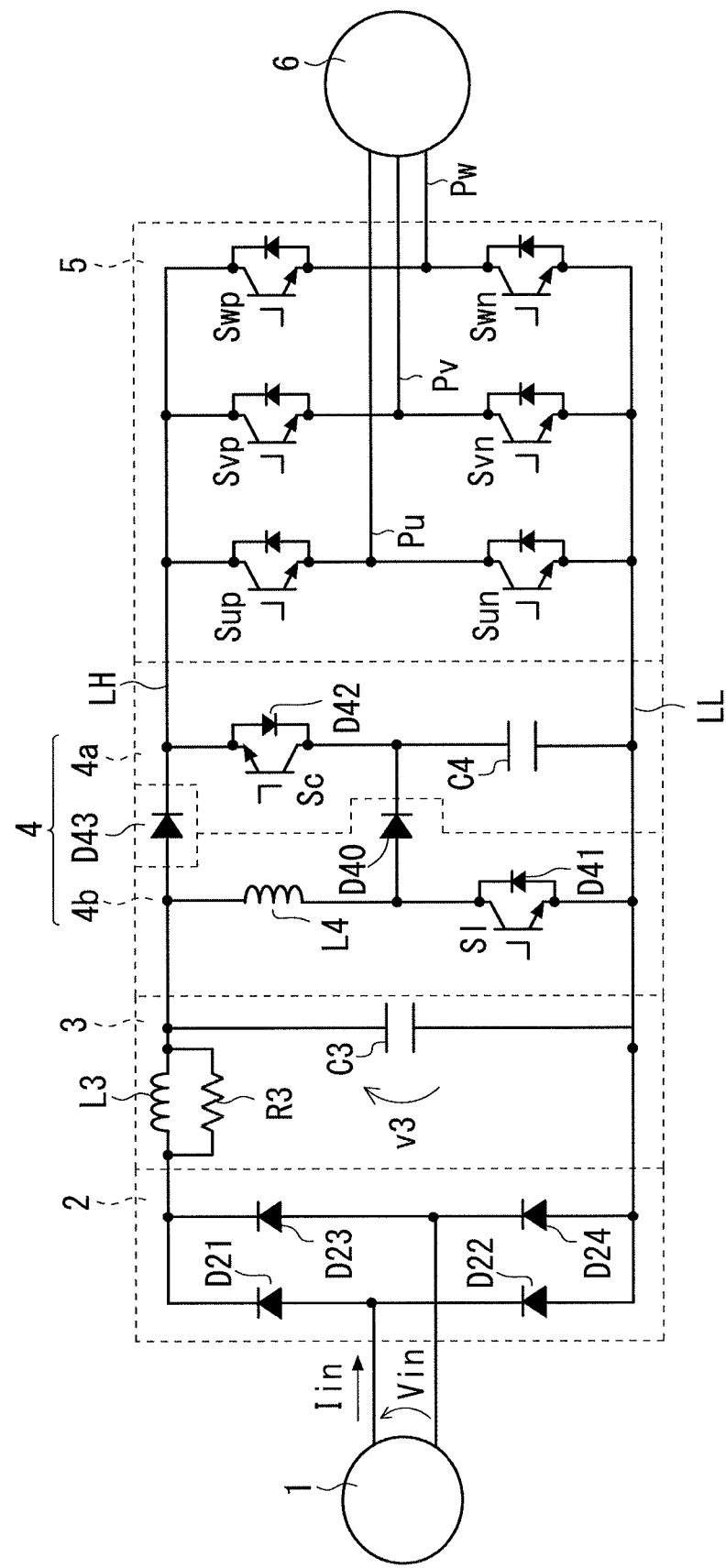
FIG. 9 is a constitutional diagram showing one example of the conceptual configuration of the direct power conversion device.
Figure 10:
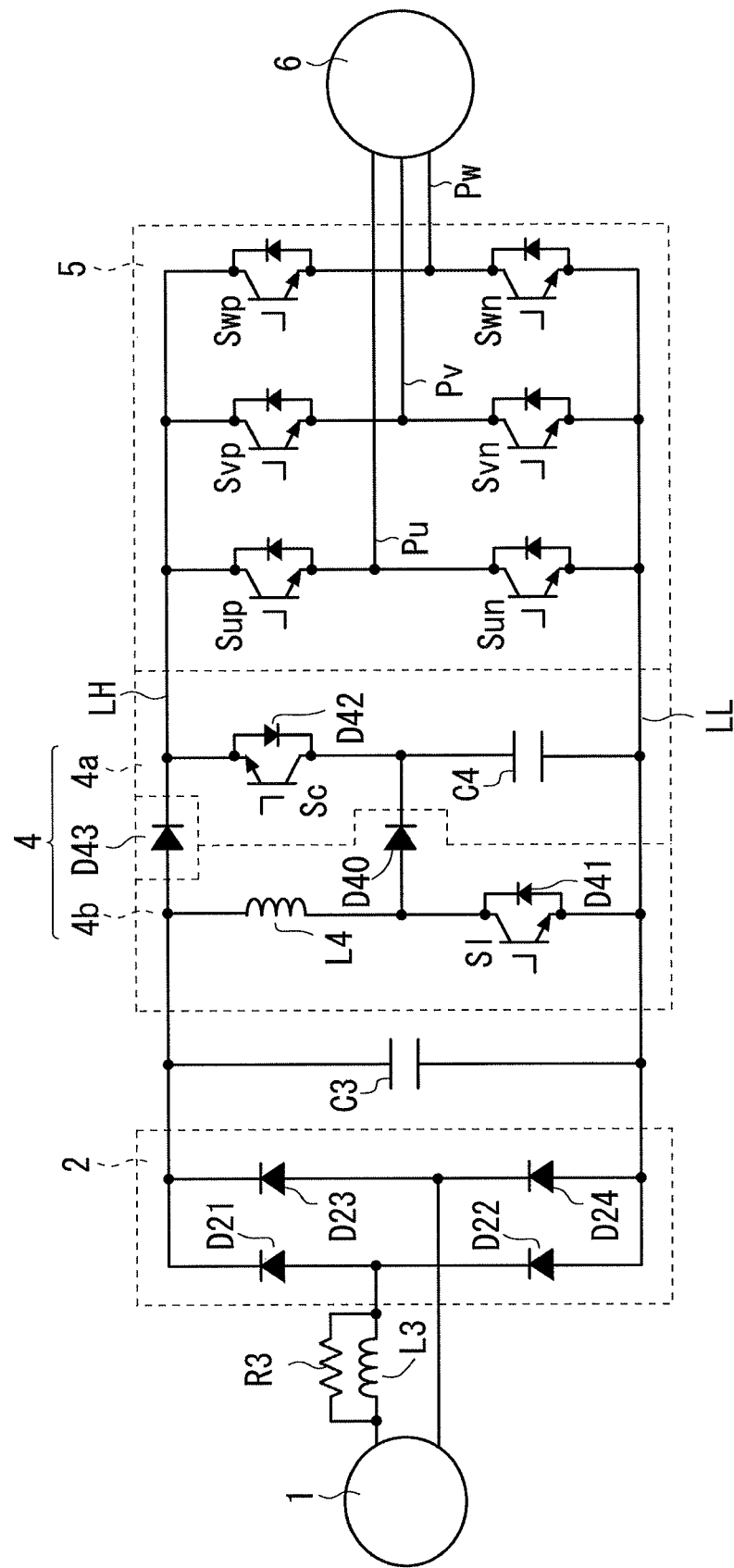
FIG. 10 is a constitutional diagram showing one example of the conceptual configuration of the direct power conversion device.

A direct power conversion device according to a second embodiment is further provided with a resistor R3 that is connected in parallel to the reactor L3, as shown in FIG. 9. The reactor L3 may be provided on the input side of the diode rectifier 2 as in the first embodiment, and also in this case, the resistor R3 is connected in parallel to the reactor L3 as shown in FIG. 10.

Figure 11:
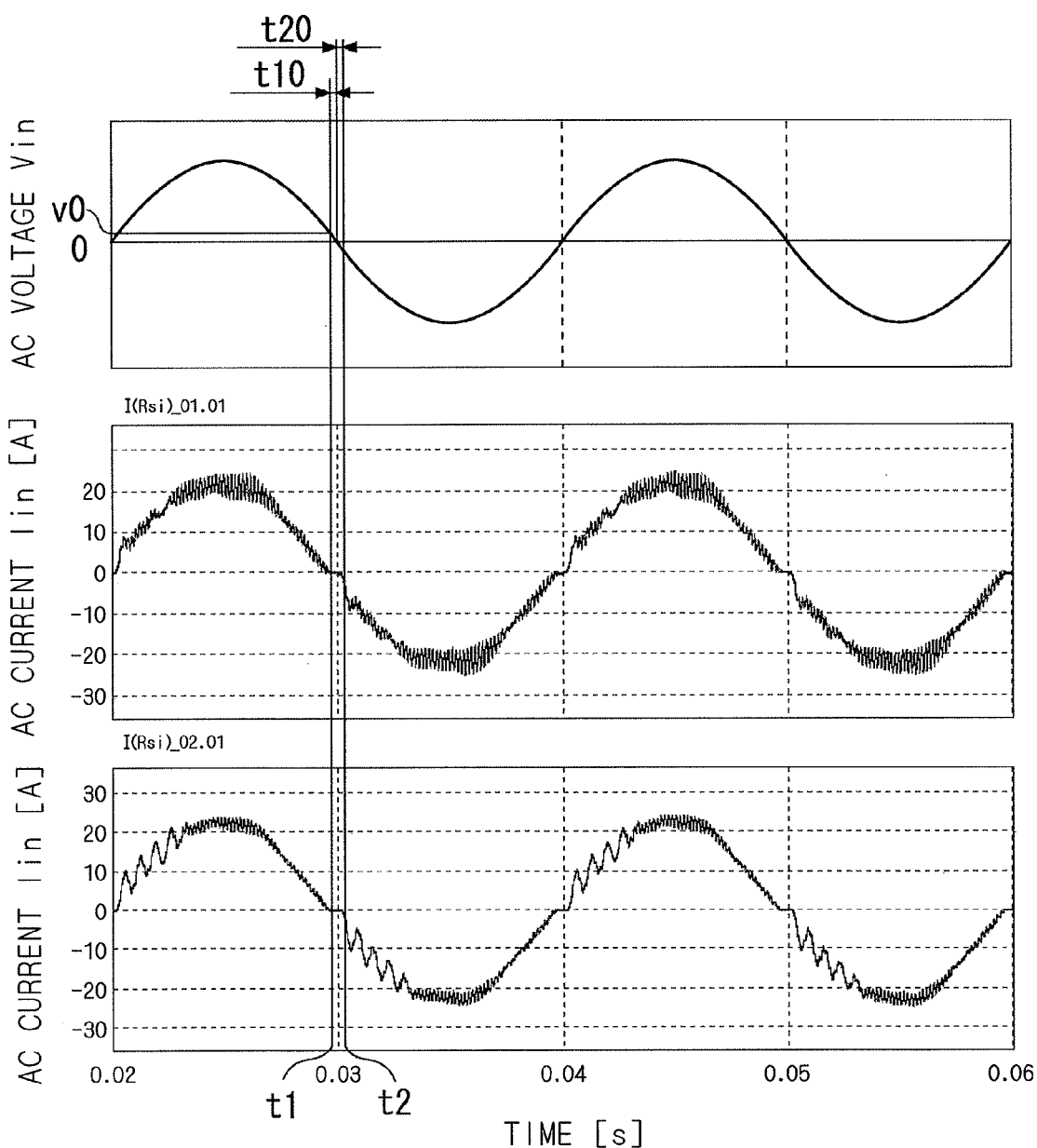
FIG. 11 is a diagram showing one example of a single-phase AC voltage and input currents that are inputted by the diode rectifier.

Such a resistor R3 functions as a so-called damping resistor. Therefore, by adjusting a resistance value of this resistor R3, a waveform of the input current Iin that is inputted into the diode rectifier 2 can be adjusted. Hereinafter, the relationship between the resistance value of the resistor R3 and the waveform of the input current Iin will be described in detail. FIG. 11 shows a single-phase AC voltage Vin and input currents Iin in the case of making resistance values of the resistor R3 different. In FIG. 11, the AC voltage Vin is schematically represented as a graph on the top, the input current Iin when the resistance value of the resistor R3 is 10 [Ω] is shown below the AC voltage Vin, and the input current Iin when the resistance value of the resistor R3 is 100 [Ω] is shown on the bottom.

It is to be noted that here, 460 [μH] is adopted as inductance of the reactor L3, and 25 [μF] is adopted as a capacitance of the capacitor C3. In this case, an attenuation factor of the filter 3 when the resistance value of the resistor R3 is 10 [Ω] is 0.22, and an attenuation factor when the resistance value of the resistor R3 is 100 [Ω] is 0.02.

As shown in FIG. 11, a high-frequency harmonic component has been generated in the input current Iin. This harmonic component is caused by switching of the inverter 5 or the like. The harmonic component in the case of the resistance value of the resistor R3 being 10 [Ω] can be seen as a harmonic component in the vicinity of where the input current Iin takes the peak or the bottom.

In FIG. 11, an amplitude of vibration of the harmonic component is smaller when the resistance value is 10 [Ω] than when the resistance value is 100 [Ω]. That is, the larger the resistance value of the resistor R3 is, the smaller the harmonic component is.

On the other hand, as shown in FIG. 11, when the resistance value of the resistor R3 is 100 [Ω], distortion of a frequency lower than the harmonic component has been generated in the input current Iin. This is caused by a phase difference between the input current Iin and the AC voltage Vin, as will be described in the following. That is, when a phase of the input current Iin is advanced with respect to the single-phase AC voltage Vin, at a time point t1 when the input current Iin decreases and reaches zero, the single-phase AC voltage Vin takes a positive value v0.

Then in a period t10 when the AC voltage Vin decreases from the value v0 and reaches zero, the AC voltage Vin is positive. This period t10 is phase advancing time for the input current Iin with respect to the AC voltage Vin, and it will thus be referred to as phase advancing time t10 hereinafter. Since the AC voltage Vin is positive in this period t10, the diode rectifier 2 does not become conductive, namely the input current Iin cannot become negative but becomes zero.

Further, since the AC voltage Vin takes the positive value v0 at the time point t1, the voltage v3 between both ends of the capacitor C3 does not become zero, but takes a predetermined value (e.g. value v0) as a minimum value.

Immediately after the AC voltage Vin falls below zero, since the absolute value (rectified voltage) of the AC voltage Vin does not exceed the voltage v3 between both ends of the capacitor C3, the diode rectifier 2 does not become conductive and the input current Iin holds zero. That is, as illustrated in FIG. 11, the input current Iin holds zero also in a period t20 that is from the time point when the AC voltage Vin reaches zero to a time point when its absolute value matches with the voltage v3 between both ends.

When the absolute value of the AC voltage Vin then exceeds the voltage v3 between both ends of the capacitor C3, the diode rectifier 2 becomes conductive. The input current IM abruptly changes in association with this conduction, and when the resistance value of the resistor R3 is large and the attenuation factor of the filter 3 is small, the input current Iin vibrates by a resonance action of the LC filter (cf. the input current Iin in the case of the resistance value being 100 [Ω]). Hereinafter, a vibration waveform of the input current Iin will be referred to as a filter resonance waveform.

On the other hand, when the resistance value of the resistor R3 is small and the attenuation factor of the LC filter is large, a vibration due to resonance is hardly generated in the input current Iin. That is, the smaller the resistance value of the resistor R3, the smaller the amplitude of the filter resonance waveform.

As described above, the harmonic component caused by switching of the inverter 5 or the like and the amplitude of the filter resonance waveform caused by resonance of the LC filter have a trade-off relationship with each other with respect to the resistance value of the resistor R3. By adjusting the resistance value of the resistor R3 in consideration of such a trade-off relationship, it is possible to appropriately adjust the waveform of the input current Iin. For example in the case of preferentially reducing the amplitude of the filter resonance, a relatively small value is adopted as the resistance value of the resistor R3.

Third Embodiment

A configuration of a direct power conversion device according to a third embodiment is the same as that of the direct power conversion device according to the first or second embodiment. Here, it is intended to suppress a resonance frequency component of the input current Iin by control. First, one example of a method for controlling the direct power conversion device will be summarized, and thereafter, the control for suppressing the vibration of the input current IM will be described.

<Basic Idea of Reduction in Power Ripple>

In the direct power conversion device shown in FIG. 1m, the diode rectifier 2 performs full-wave rectification. Accordingly, in a case where power that is consumed in the inverter 5 and the inductive load 6 is constant (e.g., a case where the inductive load 6 is a symmetrical three-phase load: this applies to a large number of inductive loads), when the charge/discharge circuit 4 is ignored, power that is supplied to the DC power lines LH, LL ripples as having a frequency twice as high as a frequency of the single-phase AC voltage. Therefore, the ripple is reduced by the charge/discharge circuit 4. Specifically, power is transferred between the buffer circuit 4a and the DC power lines LH and LL, thereby to reduce the ripple.

Instantaneous power Pin that is inputted into the diode rectifier 2 is represented by the following expression with an input power factor taken as 1. However, there have been introduced an amplitude Vm of the AC voltage Vin, a power supply angular velocity ω, an amplitude Im of the input current Iin, and time t. A product ωt of the power supply angular velocity ω and the time t expresses a phase angle of the AC voltage Vin. Further, the AC waveform has been grasped as a sine value of the phase angle ωt of the AC waveform.

$$Pin = Vm \cdot Im \cdot \sin^2(\omega t) \qquad (1)$$
$$= \frac{1}{2} Vm \cdot Im - \frac{1}{2} Vm \cdot Im \cdot \cos(2\omega t)$$

A second term on the right side of Expression (1) shows a power ripple. In order to cancel such a power ripple, instantaneous transferred power Pbuf, which is the same value as and has a different polarity from the second term, may be transferred between the buffer circuit 4a and the DC power lines LH and LL. Such instantaneous transferred power Pbuf is expressed by the following expression.

$$Pbuf = \frac{1}{2} Vm \cdot Im \cdot \cos(2\omega t) \qquad (2)$$

That is, the instantaneous transferred power Pbuf is expressed by a product of a DC portion (Vm·Im/2) of the instantaneous power that is inputted from the single-phase AC power supply 1 and a cosine value cos(2 ωt) with respect to a value (2ωt) that is twice as large as the phase angle wt.

It is found from Expression (2) that the instantaneous power (hereinafter referred to as "instantaneous transferred power") Pbuf transferred by the buffer circuit 4a can take a positive or negative value. Specifically, the instantaneous transferred power Pbuf takes a positive value in a period (hereinafter referred to as "giving period") when the phase angle wt of the single-phase AC voltage is not smaller than 0 and not larger Than π/4, not smaller than 3π/4 and not larger than 5π/4, or not smaller than 7π/4 and not larger than 2π, and the instantaneous transferred power Pbuf takes a negative value in a period (hereinafter, "receiving period") other than this. That is, the buffer circuit 4a gives an absolute value of the instantaneous transferred power Pbuf to the DC power lines LH, LL in the giving period, and receives the absolute value of the instantaneous transferred power Pbuf from the DC power lines LH, LL in the receiving period. Thereby, the power ripple is canceled.

With the single-phase AC voltage Vin being expressed by Vm·sin(ωt), by putting the above range in other words, it is also possible to grasp that the charge/discharge circuit 4 outputs positive power when the absolute value of the AC voltage Vin is lower than a value that is $1/\sqrt{2}$ of its amplitude Vm, and the charge/discharge circuit 4 outputs negative power when the absolute value is higher than the value that is $1/\sqrt{2}$ of the amplitude Vm.

Hereinafter, specific operations in the giving period and the receiving period will be described, but prior to this, first, formulation necessary for consideration will be performed.

Figure 12:
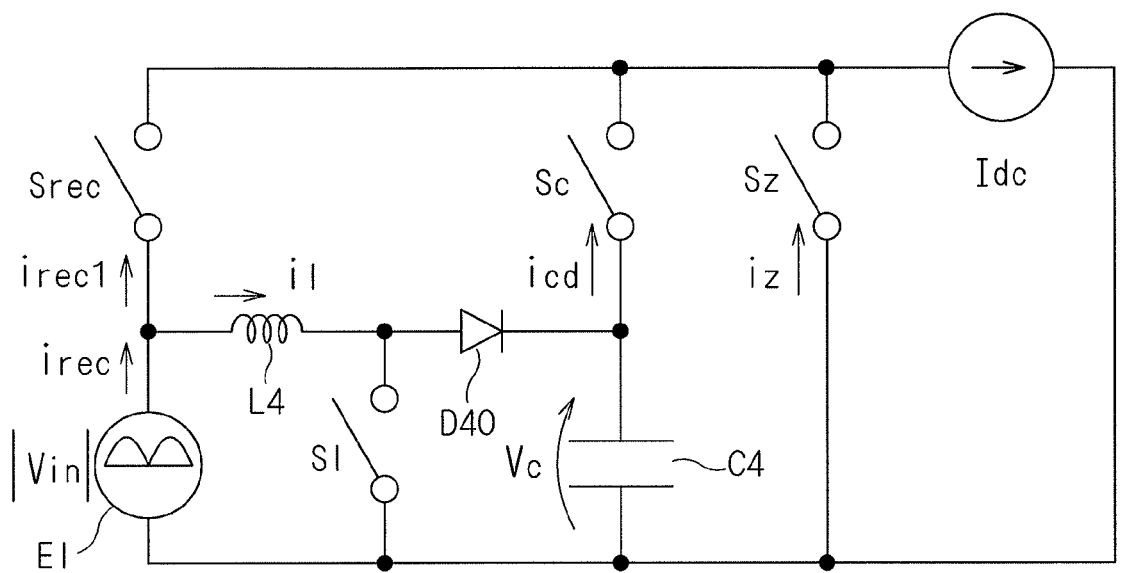
FIG. 12 is a circuit diagram showing an equivalent circuit of a direct power conversion circuit shown in FIG. 1.

FIG. 12 is an equivalent circuit of the circuit shown in FIG. 1. In the equivalent circuit shown in FIG. 12, a current irec1 from the diode rectifier 2 and the filter 3 to the inverter 5 is equivalently expressed as a current irec1 that travels via a switch Srec. Similarly, a discharge current icd flowing from the capacitor C4 to the inverter 5 is equivalently expressed as the discharge current icd that travels via the switch Sc. In the inverter 5, a current, which flows in the inductive load 6 via the inverter 5 when the output ends Pu, Pv, Pw are commonly connected to one of the DC power lines LH, LL, is also equivalently expressed as a current iz that travels via a switch Sz. It is to be noted that a voltage vector including a zero voltage vector will be described in detail later. Further, in FIG. 12, the reactor L4, the diode D40 and the switch S1 constituting the booster circuit 4b are expressed, and a current il flowing in the reactor L4 is added.

Further, in the equivalent circuit of FIG. 12, an output voltage of the filter 3 is shown in a voltage source E1. The voltage source E1 outputs a rectified voltage (=absolute value of the AC voltage Vin) that is outputted by the diode rectifier 2. That is, such an equivalent circuit is based on the idea that the rectified voltage is inputted into the inverter 5 when the current flows from the converter to the inverter 5 (when the switch Srec is conductive).

In the equivalent circuit obtained in such a manner, by introducing duties drec, dc, dz as respective time ratios for conduction of the switches Srec, Sc, Sz and a DC current Idc that is inputted into the inverter 5, the following expression holds.

$$\begin{pmatrix} irec \\ icd \\ iz \end{pmatrix} = \begin{pmatrix} drec & 1 \\ dc & 0 \\ dz & 0 \end{pmatrix} \cdot \begin{pmatrix} Idc \\ il \end{pmatrix} \quad (3)$$

In addition, as can be seen from FIG. 12, a current irec flowing in the diode rectifier 2 is equal to a sum of the current irec1 that makes the switch Sc conductive and the current il flowing in the reactor L4. Further, since the current irec1 is expressed by a product of the rectification duty drec and the DC current Idc, the current irec is shown by a sum of drec·Idc and the current il as shown in the formula (3).

It should be noted that, since the currents irec1, icd, iz are ones obtained by respectively multiplying the DC current Idc by duties drec, dc, dz, these are average values in switching cycles of the switches Srec, Sc, Sz. Further, similarly, the current it is also an average value in a switching cycle of the switch S1.

Moreover, since the DC current Idc is a sum of the currents irec1, icd, iz that respectively make the switches Srec, Sc, Sz conductive, the following expression holds.

$$drec + dc + dz = 1 \quad (4)$$

Accordingly, the duties drec, dc, dz can be seen as current distribution ratios of the DC current Idc to the respective currents irec1, icd, iz. Hereinafter, the duties drec, de, dz may be respectively referred to as a rectification duty drec, a discharge duty de and a zero duty dz.

<Operation in Giving Period>

In the giving period, the switch Sc is operated to allow the discharge current icd flow from the capacitor C4, thereby giving the instantaneous transferred power Pbuf from the buffer circuit 4a to the DC power lines LH, LL. Thus, the switch S1 is not made to conduct, which makes the current il zero. That is, the booster circuit 4b is not operated in the giving period.

Here, in order to form the current irec flowing in the diode rectifier 2 into the sine wave shape, the current irec may satisfy the following expression.

$$irec = Im \cdot |\sin(\omega t)| \quad (5)$$

Since il=0 holds in Expression (3), irec=drec·Idc holds. From Expression (5), therefore, the rectification duty drec is set to the following expression.

$$drec = \frac{Im}{Idc}|\sin(\omega t)| \quad (6)$$

Further, in order to reduce the power ripple, a product (vc·icd) of the voltage vc between both ends of the capacitor C4 and the discharge current icd may be equal to the instantaneous transferred power Pbuf (Expression (2)). Accordingly, from Expressions (2) and (3), the discharge duty de is set as in the following expression. Hence there is performed discharge of the capacitor C4 for canceling the power ripple.

$$dc = \frac{Vm \cdot Im}{2vc \cdot Idc} \cdot \cos(2\omega t) \quad (7)$$

From Expression (4), the zero duty dz becomes a value obtained by subtracting the rectification duty drec and the discharge duty de from 1.

It should be noted that the switch Srec is not practically provided but merely appears in the equivalent circuit. Conduction/non-conduction thereof is then decided subordinate to operations of the switch Sc and the inverter 5. Such an operation will be described later along with the operation of the inverter 5.

<Operation in Receiving Period>

In the receiving period, since the buffer circuit 4a does not give power to the DC power lines LH and LL, the switch Sc is not made conductive and the discharge duty de is made zero.

The following expression is derived from Expression (3).

$$irec = drec \cdot Idc + il \quad (8)$$

Here, a product of the current irec1 (=drec·Idc) and a value |Vin| obtained by performing full-wave rectification on the AC voltage Vin is desirably made equal to a DC portion (Vm·Im/2) of the instantaneous power Pin expressed by Expression (1). This is because transferring the instantaneous transferred power Pbuf allows power consumed at a stage subsequent to the diode rectifier 2 to be a constant value as a DC portion of the instantaneous power Pin. The following expression is thereby derived.

$$|Vin| \cdot irec1 = \frac{Vm \cdot Im}{2} \quad (9)$$

Since the single-phase AC voltage Vin is expressed by Vm·sin(ωt) and the current irec1 is expressed by drec·Idc, the rectification duty drec is set from Expression (9) as in the following expression.

$$drec = \frac{Im}{2Idc \cdot |\sin(\omega t)|} \quad (10)$$

The zero duty dz is set to a value obtained by subtracting the rectification duty drec from 1 (Expression (4)). Setting the zero duty dz in such a manner allows setting of a zero voltage vector period for cancelling the output power ripple.

Next, the current il flowing in the reactor L4 will be described. As in the giving period, in order to form the current irec flowing in the diode rectifier 2 into the sine wave shape, the current irec needs to satisfy Expression (5). Therefore, the current il is set by the following expression in consideration of Expressions (8) and (10).

$$il = Im \cdot |\sin(\omega t)| - \frac{Im}{2 \cdot |\sin(\omega t)|} \quad (11)$$

That is, the current il for forming the input current Iin, which is inputted into the diode rectifier 2, into the sine wave shape is decided in the receiving period. Hence the booster circuit 4b may be controlled such that the current il flowing in the reactor L4 satisfies Expression (11). This booster circuit 4b may be controlled by use of any of a so-called continuous mode, discontinuous mode and critical mode. Here, as one example, the case of using the discontinuous mode will be described. Further, the current il is an average value with respect to the switching cycle of the switch S1, and hereinafter, its instantaneous value will be described as a current ils so as to be distinguished from the average value.

Figure 13:
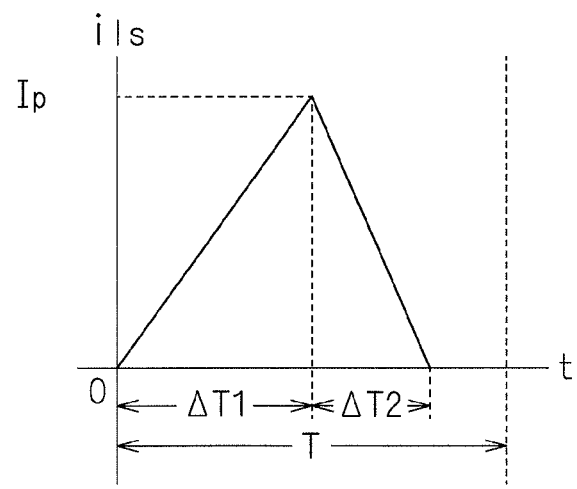
FIG. 13 is a conceptual diagram showing a waveform of a current flowing in a reactor of a booster circuit.

FIG. 13 shows a conceptual diagram of a waveform of the current ils in the discontinuous mode. Symbol T denotes the switching cycle of the switch S1, and symbol ΔT1 denotes its conduction period. Therefore, a boost duty dl for conduction of the switch S1 is expressed by ΔT1/T. Further, as shown in FIG. 13, a period when the current ils flows in the reactor L4 after turning-off of the switch S1 is taken as ΔT2. In the illustration of FIG. 13, since the current ils is discontinuous, a sum of the periods ΔT1 and ΔT2 is smaller than a cycle T. Here, for simplification, the waveform of the current ils is approximated and handled as a triangle wave. The current ils takes a value between zero and a peak value Ip.

The following expression holds from the relationship between the time t, with a start of the switching cycle taken as a reference (zero), and the periods ΔT1, ΔT2. It should be noted that the voltage vc between both ends of the capacitor C4 is charged higher than the amplitude Vm of the AC voltage Vin, by the booster circuit 4b. Further, inductance of the charging channel is expressed as a value Lm. Practically, the inductance of the charging channel is mainly inductance of the reactor L4, and hence the value Lm can be seen as the inductance of the reactor L4.

$$ils = \frac{Vin}{Lm}t \quad (0 < t < \Delta T1) \quad (12)$$

$$ils = \frac{Vin}{Lm}\Delta T1 - \frac{1}{Lm} \frac{(vc - Vin)(t - \Delta T1)}{(\Delta T1 < t < \Delta T2)} \quad (13)$$

$$ils = 0 \quad (\Delta T1 + \Delta T2 < t < T) \quad (14)$$

Since the peak value Ip is the current ils when t=ΔT1 holds, by substituting t=ΔT1 into Expression (12), the peak value Ip is found by Ip=Vin·ΔT1/Lm.

Further, since il=0 holds when t=ΔT2 holds in Expression (13), ΔT2=Vin·ΔT1/(ve−Vin) holds. While such a relationship is considered, an integral value of the current ils in the switching cycle T is found from Expressions (12) and (13), and this integral value is divided by the switching cycle T, to find the current il by the following expression.

$$il = \frac{Vin \cdot vc \cdot T}{2 \cdot Lm(vc - Vin)} \cdot dl^2 \quad (15)$$

Therefore, with Expression (11) also taken into consideration, the boost duty dl for conduction of the switch S1 is expressed by the following expression.

$$dl = \sqrt{\frac{2 \cdot Lm(vc - Vin) \cdot il}{vc \cdot Vin \cdot T}} \quad (16)$$

<Control for Operation of Inverter>

Since the switches Sc, S1 are provided in the direct power conversion device shown in FIG. 1, the duties of the switches Sc, S1 can be decided as described above. Meanwhile, the switches Srec, Sz are not practically provided in the direct power conversion device shown in FIG. 1. The switches Srec, Sz on the equivalent circuit shown in FIG. 12 are equivalently controlled by switching of the switch Sc and the inverter 5. In order to describe a method for equivalently controlling the switches Srec, Sz, first, general control of the inverter will be described.

Each of a pair of switching elements Sup, Sun corresponding to a U-phase, a pair of switching elements Svp, Svn corresponding to a V-phase, and a pair of switching elements Swp, Swn corresponding to a W-phase are controlled exclusively from each other. Therefore, the following eight switching patterns exist as the whole of the inverter 5 in accordance with a switching state of each switching element. Here, a switching state where the upper-side switching element is conductive and the lower-side switching element is non-conductive is expressed by "1", and a switching state where the upper-side switching element is non-conductive and the lower-side switching element is conductive is expressed by "0". When the switching state with respect to each phase is arrayed in the order of the U-phase, the V-phase and the W-phase, eight patterns of (0, 0, 0), (0, 0, 1), (0, 1, 0), (0, 1, 1), (1, 0, 0), (1, 0, 1), (1, 1, 0) and (1, 1, 1) exist as the switching patterns.

In the inverter 5, by realization of the respective switching patterns described above, currents Iu, Iv, Iw are respectively outputted from the output ends Pu, Pv, Pw in accordance with the switching patterns.

Figure 14:
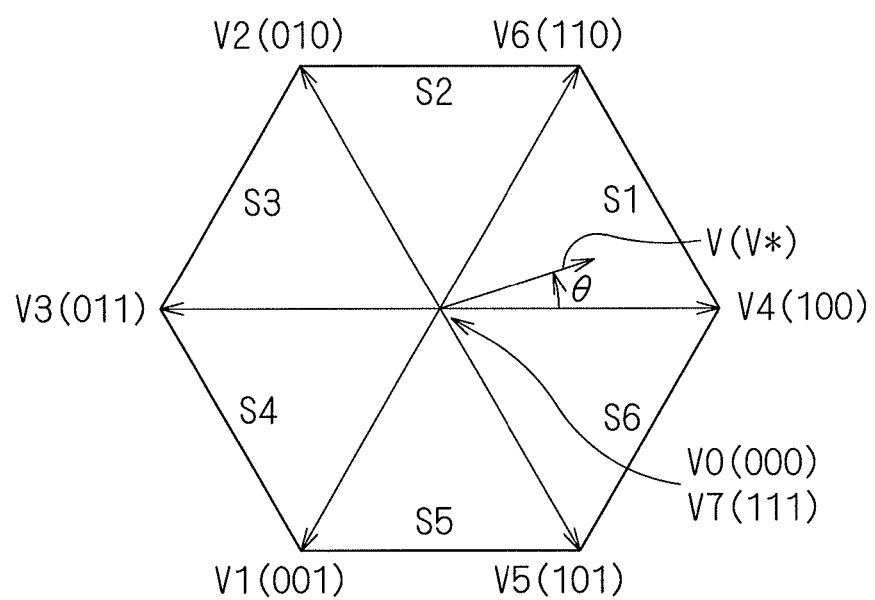
FIG. 14 is a diagram showing voltage vectors.

FIG. 14 shows voltage vectors V0 to V7 corresponding to the above switching patterns. For "x" in a symbol "Vx" showing the voltage vector, there is adopted a number obtained by capturing the above three numbers showing the switching state as a three-digit binary number and converting the binary number to a decimal number. For example, the switching pattern (1, 0, 0) is expressed as the voltage vector V4.

Starting points of the respective voltage vectors V1 to V6 are matched with a central point, and terminal points thereof are arranged radially outward. Connecting the terminal points of the respective voltage vectors V1 to V6 makes up a regular hexagon. As for the voltage vectors V0, V7, since the output ends Pu, Pv, Pw are short-circuited, the voltage vectors V0, V7 do not have magnitudes. Hence the voltage vectors V0, V7 are arranged at the central point. Such voltage vectors V0, V7 are referred to as zero voltage vectors.

It is to be noted that regular triangular regions, configured of adjacent two out of each of the vectors V1 to V6 and each of the voltage vectors V0, V7, are respectively referred to as S1 to S6.

In the inverter 5, the above switching pattern is selectively adopted and operated. In the case of controlling the inverter 5 by use of the voltage vector, a command value V* of the voltage vector can be synthesized by the voltage vectors V0 to V7. By adjusting a period when these voltage vectors are adopted, it is possible to arbitrarily set the command value V* in each of the regions S1 to S6 where it is located. However, a period when one voltage vector is continuously adopted is set to a sufficiently short period with respect to the cycle of the single-phase AC voltage.

A timing chart of FIG. 15 illustrates the operation of the direct power conversion device in the giving period. Here, a triangle wave having a cycle ts is adopted as a carrier C for simplification. In this triangle wave, for example, a minimum value and a maximum value respectively take 0 and 1, and an absolute value of inclination at the time of increase and an absolute value of inclination at the time of decrease are equal to each other.

In the giving period, the boost duty dl is zero since the booster circuit 4b is not operated as described above, the rectification duty drec and the discharge duty dc are respectively set by Expressions (6) and (7), and the zero duty dz is set by Expression (4) based on the rectification duty drec and the discharge duty dc.

When it is assumed that the switch Srec becomes conductive when the carrier C takes a value not smaller than the rectification duty drec, the switch Srec results in being conductive at the rectification duty drec (is conductive equivalently in a period trec=drec·ts). Further, since Expression (4) holds, when it is assumed that the switch Sc becomes conductive when the carrier C takes a value not smaller than a sum (drec+dz) of the duties, the switch Sc results in being conductive at the discharge duty dc (is conductive in a period tc=dc·ts). Then, when the carrier C takes a value that is not smaller than the rectification duty drec and not larger than the sum (drec+dz), the switch Sz results in being conductive (is conductive in a period tz/2=dz·ts/2 that appears twice in one cycle ts: the period tz is divided into two since the absolute value of the inclination at the time of increase in carrier C is equal to that of the inclination at the time of decrease therein). As thus described, by comparing the command value based on the duties drec, dz with the carrier C, the periods trec, tc, tz, in which the respective switches Srec, Sc, Sz are made equivalently conductive in one cycle ts of the carrier C, are set. As a result of such comparison of the carrier, the timing for conduction of the switch Sc is decided.

The inverter 5 is subjected to such control as follows in order to make the diode rectifier 2 perform an operation equivalent to making the switch Srec conductive in the period trec and make the inverter 5 perform an operation equivalent to making the switch Sz conductive in the period tz. It should be noted that in FIG. 15, conduction/non-conduction of the switching elements Sun, Svn, Swn, which are controlled exclusively from the switching elements Sup, Svp, Swp, respectively, is not shown.

Here, for simplification, there will be described the case of finding a conduction period of each switching element in the inverter 5 by use of the same carrier C as the carrier used for leading to the periods trec, tc, tz of the switches Srec, Sc, Sz.

FIG. 15 illustrates the case of synthesizing the command value V* of the voltage vector by use of the voltage vectors V0, V4, V6 in the inverter 5. Such synthesis is, for example, adopted when the command value V* of the voltage vector is in the region S1. It should be noted that, although the case of not adopting the zero voltage vector V7 will be described for simplification, the zero voltage vector V7 may be adopted.

Generally, when the operation of the inverter 5 is controlled, phase voltage commands Vu*, Vv*, Vw* are adopted as command values of output voltages at the output ends Pu, Pv, Pw. In the case shown in FIG. 15, modulations by use of the voltage vectors V0, V4, V6 are illustrated, and hence the relationship of 0<Vu*<Vv*<Vw*=1 holds.

In order to make the diode rectifier 2 to perform commutation when the inverter 5 is operated adopting the zero voltage vector, the command value, with which the carrier C is to be compared, is changed at the time of the carrier C taking a value of the rectification duty drec. Specifically, the switching element Sup is made conductive when the carrier C is not larger than drec·(1−Vu*), the switching element Svp is made conductive when the carrier C is not larger than drec·(1 Vv*), and the switching element Swp is made conductive when the carrier C is not larger than drec·(1−Vw*).

Such a conduction pattern corresponds to comparison between the conventional triangle wave and the phase voltage commands Vu*, Vv*, Vw* in the period trec. This is because, out of the carrier C, a triangle wave portion where values 0 to drec are taken is internally divided by Vu*, Vv* and Vw*. However, since Vw*=1 holds in the example of FIG. 15, drec·(1−Vw*)=0 holds, and the switching element Swp is not conductive in the period trec. From the above operation, for example, the voltage vectors V0, V4, V6, V4, V0 are adopted in this order in the period trec.

Further, the switching element Sup is made conductive when the carrier C is not smaller than drec+dz+dc·Vu*, the switching element Svp is made conductive when the carrier C is not smaller than drec+dz+dc·Vv*, and the switching element Swp is made conductive when the carrier C is not smaller than drec+dz+dc·Vw*.

Such a conduction pattern corresponds to comparison between the conventional triangle wave and the phase voltage commands Vu*, Vv*, Vw* in the period tc. This is because, out of the carrier C, a triangle wave portion where values drec+dz to 1(=drec+dz+dc) are taken is internally divided by Vu*, Vv* and Vw*. However, since Vw*=1 holds in the example of FIG. 15, drec+dz+dc·Vw*=1 holds, and the switching element Swp is not conductive in the period tc. From the above operation, the voltage vectors V0, V4, V6, V4, V0 are adopted in this order also in the period tc as in the period trec.

By control of each switching element in the periods trec, tc, the switching elements Sup, Svp, Swp are non-conductive in a period tz/2 that is sandwiched between the periods trec and tc. Accordingly, the voltage vector V0 is outputted as the zero voltage vector in the period tz/2.

On the other hand, the operation of the inverter 5 by other than the zero voltage vector is allowed when the inverter 5 receives a current from the DC power lines LH, LL. Therefore, the operation of the inverter 5 by other than the zero voltage vector is performed when the switch Sz is non-conductive.

In addition, as obvious from the foregoing description, the period tz is a period that is decided by the duty dz. In other words, it is a period when the inverter 5 adopts the zero voltage vector regardless of (not depending on) the phase voltage commands Vu*, Vv*, Vw*. That is, it can also be grasped that the duty dz is a duty at which the inverter 5 is operated with the zero voltage vector regardless of magnitude of a voltage that the inverter 5 outputs. Further, it can also be grasped that the rectification duty drec is a duty obtained by subtracting 1 from a sum of the discharge duty dc and the zero duty dz in consideration of Expression (4).

Figure 16:
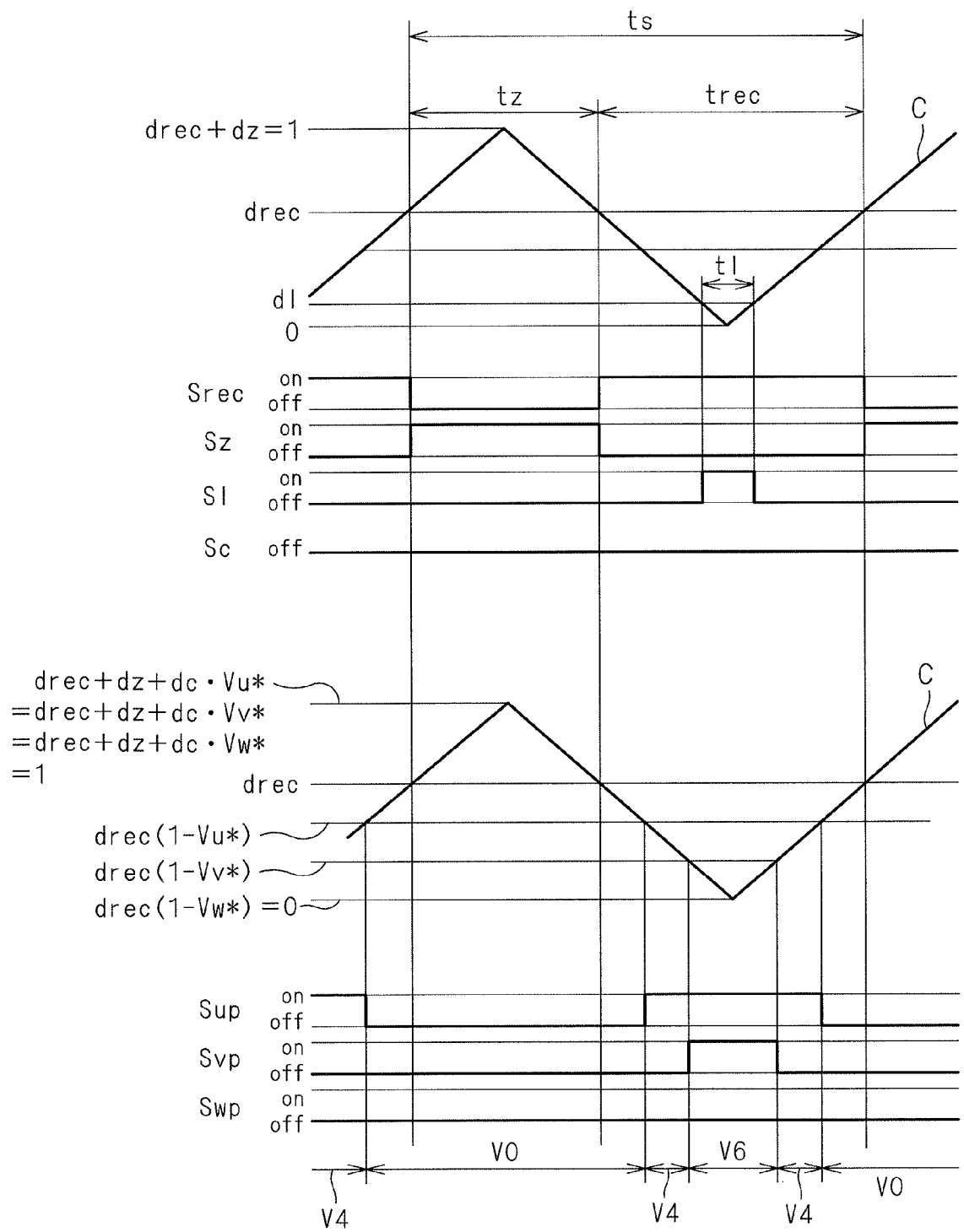
FIG. 16 is a timing chart explaining an operation of the direct power conversion device in a receiving period.

A timing chart of FIG. 16 illustrates an operation of the direct power conversion device in the receiving period. Also in the receiving period, the same carrier C as in the giving period is adopted. Further, the rectification duty drec and the discharge duty dc are respectively set by Expressions (10) and (16) (however, Expression (11) is used for the current il adopted in Expression (16)).

As in the giving period, it is set such that the switch Srec becomes conductive when the carrier C takes a value not smaller than the rectification duty drec. However, in the receiving period, as described above, the discharge duty dc is zero, and drec+dz=1 holds from Expression (4). Therefore, different from the giving period, the switches Srec, Sz exclusively become conductive/non-conductive.

As thus described, by comparing the command value based on the duty drec with the carrier C, the periods trec, tz are set in which the respective switches Srec, Sz are made equivalently conductive in one cycle ts of the carrier C.

Also in the receiving period, as for the operation of the inverter 5, in the period trec, the operations of the switching elements Sup, Svp, Swp are decided by comparison between the command values drec·(1−Vu*), drec·(1−Vv*), drec·(1−Vw*) with the value of the carrier C, and the voltage vectors V0, V4, V6, V4, V0 are adopted in this order.

Further, since dc=0 holds, all of the command values drec+dz+dc·Vu*, drec+dz+dc·Vv* and drec+dz+dc·Vw* results in being 1, and the inverter 5 performs an operation based on the zero voltage vector V0 in the period tz.

Further, the switch S1 is, for example, controlled in such a manner as follows. For example in the case of adopting the discontinuous mode, since a constant value can be adopted as the switching cycle T, here, the cycle ts of the carrier C is adopted as the switching cycle T for simplification. Then, when it is set that the switch S1 becomes conductive when the carrier C takes a value not larger than the duty dl, the switch S1 results in being conductive at the duty dl. The duty dl can be found by adopting T=ts in Expression (16). That is, a period t1 when the switch S1 is conductive is found by a product of the duty dl and the cycle ts. This corresponds to the period ΔT1 in FIG. 13.

It should be noted that, although the case is illustrated here in which the switch S1 is switched in the period tree in synchronization with the carrier C, it may be switched in the period tz or in both the periods tz and tree, or it may be switched based on a carrier other than the carrier C.

<Control for Suppressing Resonance Frequency Component of Input Current>

The current Irec as an absolute value of the input current Iin is a sum of the current irec1 (=drec·Idc) flowing from the diode rectifier 2 to the inverter 5 and the current il flowing in the reactor L4 (Expression (8)). Therefore, by adjusting the rectification duty drec or the current il, it is possible to adjust the current Irec, and further to adjust the input current Iin.

The filter resonance waveform of the input current Iin is generated immediately after the input current Iin leaves zero, as described in the second embodiment (cf. FIG. 11). Hence this filter resonance waveform is mainly generated in the giving period T1. Since the current il is, for example, set to zero in the giving period T1, the input current Iin depends on the current irec1 in the giving period T1. Therefore, in the third embodiment, it is intended that the rectification duty drec is adjusted, thereby adjusting the current Irec, and furthermore reducing the filter resonance waveform of the input current Iin.

Figure 17:
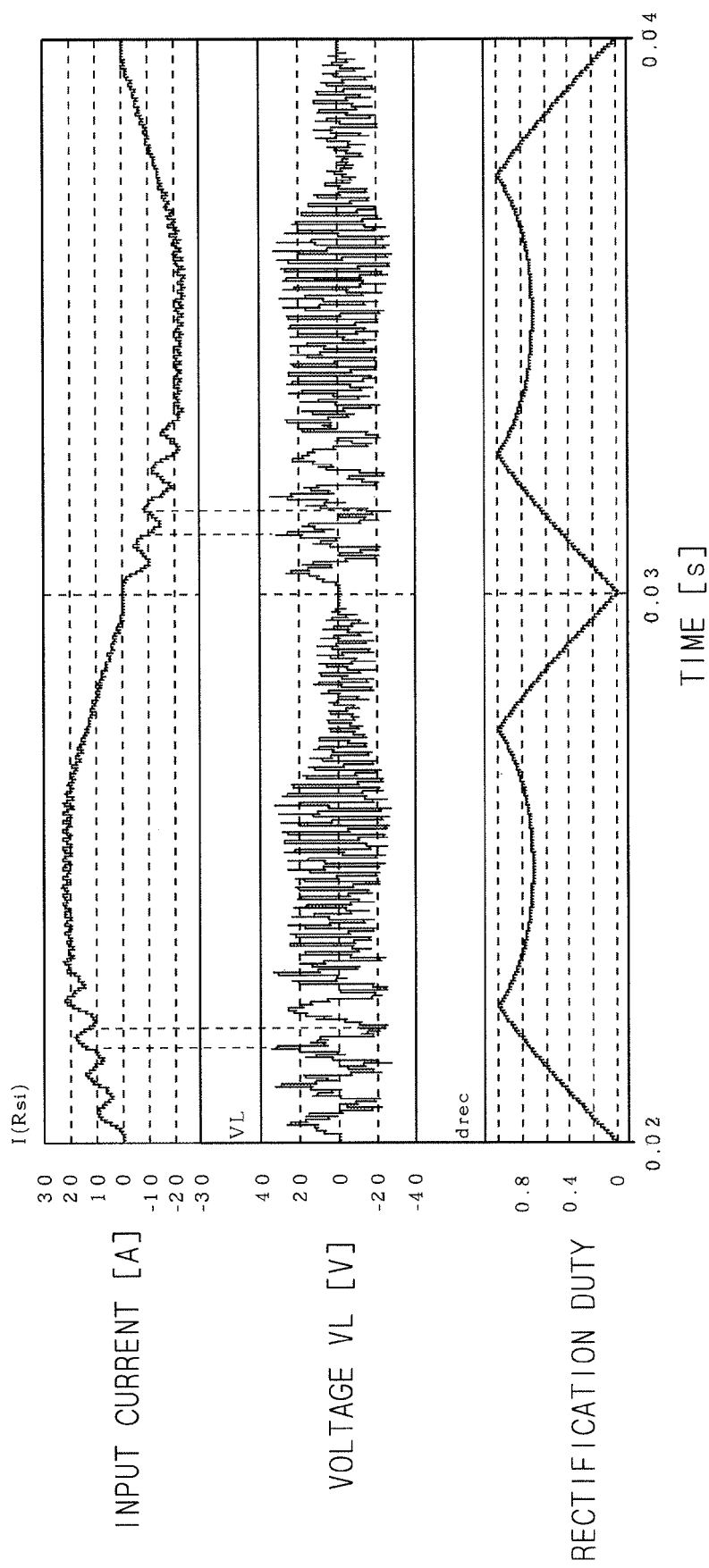
FIG. 17 is a diagram showing one example of an input current, a voltage between both ends of the reactor of the booster circuit and a rectification duty.

On the other hand, as shown in FIG. 17, a voltage VL between both ends of the reactor L3 varies in accordance with a high frequency component of the input current En (including a harmonic component due to switching of the inverter 5 and a filter resonance waveform). The higher the rate of change in current flowing in the reactor L3 is, namely the current irec, the higher value the voltage VL takes. Since the current Irec is the absolute value of the input current Iin, as shown in FIG. 17, when the input current Iin is in a positive range, the higher the rate of change therein is, the higher value the voltage VL takes, and when the input current Iin is in a negative range, the lower the rate of change therein is, the higher value the voltage VL takes.

As thus described, the voltage VL varies in accordance with the filter resonance waveform of the input current Tin. Therefore, in the third embodiment, the voltage VL of the reactor L3 is detected, and the rectification duty drec is corrected based on the detected voltage VL. More specifically, correction is performed such that, the larger the voltage VL is, the more the rectification duty drec is reduced, and the smaller the voltage VL is, the more the rectification duty drec is increased. As a more specific example, there is performed correction of subtracting a correction value (K·VL), obtained by multiplying the voltage VL by a predetermined value K, from the rectification duty drec. Hereinafter, the rectification duty drec after the correction will be referred to as a post-correction rectification duty drec'.

Then, the switches Se, S1 and the inverter 5 are made to perform control equivalent to making the switch Srec conductive by the post-correction rectification duty drec'. While the specific control is as described above, the post-correction rectification duty drec' is adopted as the rectification duty drec. Further, it is desirable to change at least either the discharge duty dc or the zero duty dz in association with the adoption of the post-correction rectification duty drec'. This is because a sum of the duties drec', dc and dz is held 1 from Expression (4).

The discharge duty dc is, for example, set so as to cancel the power ripple by Expression (7). Hence, when the discharge duty de is changed, the power ripple suppression effect deteriorates. Therefore, not the discharge duty dc but the zero duty dz is changed. The zero duty after the change is referred to as dz'. More specifically, the zero duty dz' after the change is found by subtracting a sum of the post-correction rectification duty drec' and the discharge duty de from 1.

Then, controlling the switch Sc and the inverter 5 by use of the duties drec', dc, dz' as described above allows the switch Srec to become equivalently conductive by the post-correction rectification duty drec'. It is to be noted that in this control, a zero-phase current of the inverter 5 is controlled by use of the zero duty dz'.

According to such control, the larger the voltage VL is, the more the post-correction rectification duty drec' is reduced, and hence the current irec1 (=drec'·Idc) can be reduced when the voltage VL is large. In other words, the current Irec (=Irec1+il=|Iin|) can be reduced when the rate of change in input current Iin is large. This allows suppression of the resonance frequency component of the input current Iin.

Figure 18:
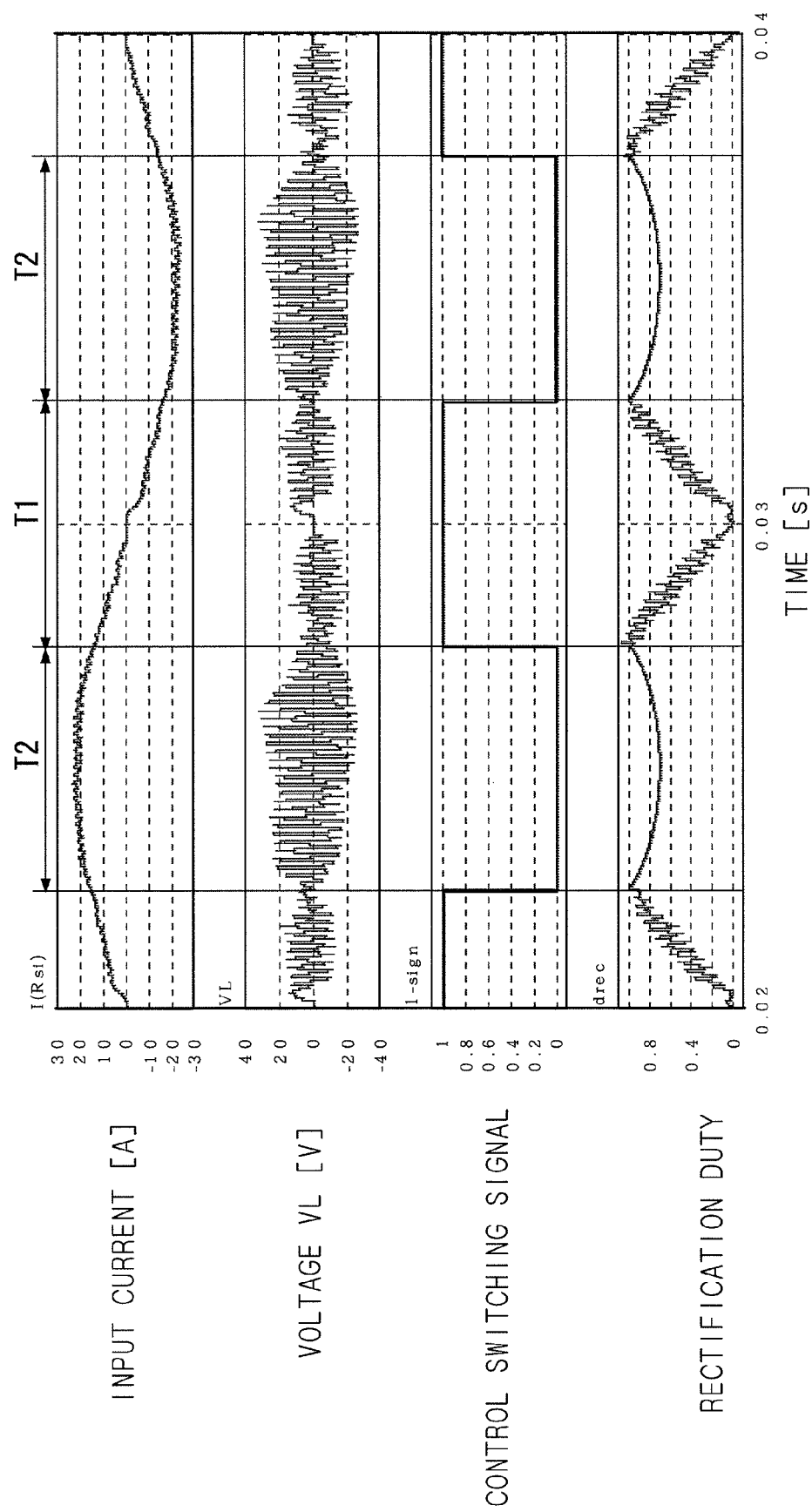
FIG. 18 is a diagram showing one example of an input current, a voltage between both ends of the reactor of the booster circuit, a control switching signal and a rectification duty.

FIG. 18 shows a result of simulation in the case of adopting the post-correction rectification duty drec'. As can be understood from comparison between FIGS. 17 and 18, it is found that the amplitude of the input current Iin (amplitude of the filter resonance waveform) can be reduced by correction of the rectification duty drec.

It should be noted that in the illustration of FIG. 18, a harmonic component caused by switching of the inverter 5 or the like is hardly reduced. This is due to the following reason. That is, in the inverter 5, a plurality of times of switching are generated per carrier cycle. Meanwhile, since a control cycle for correcting the rectification duty is at the same level as the carrier cycle, even when the rectification duty is controlled, the control is not performed in time.

Further, as described above, the filter resonance waveform of the input current Iin is generated after the time point when the input current Iin leaves zero, and resolved by the lapse of time corresponding to the characteristic of the filter 3 (cf. input current of FIG. 17). Therefore, the rectification duty drec does not need to be corrected based on the voltage VL in all of the periods, but may be corrected in at least a predetermined period after the time point when the input current Iin leaves zero. In FIG. 18, as one example, the rectification duty drec is corrected only in the giving period T1, and performance or non-performance of the correction is shown as a control switching signal. In FIG. 18, the rectification duty drec is corrected when the control switching signal is active, and the rectification duty drec is not corrected when the control switching signal is non-active. This enables reduction in number of control processes while suppressing variation in input current Iin due to resonance.

<Control Part>

Figure 19:
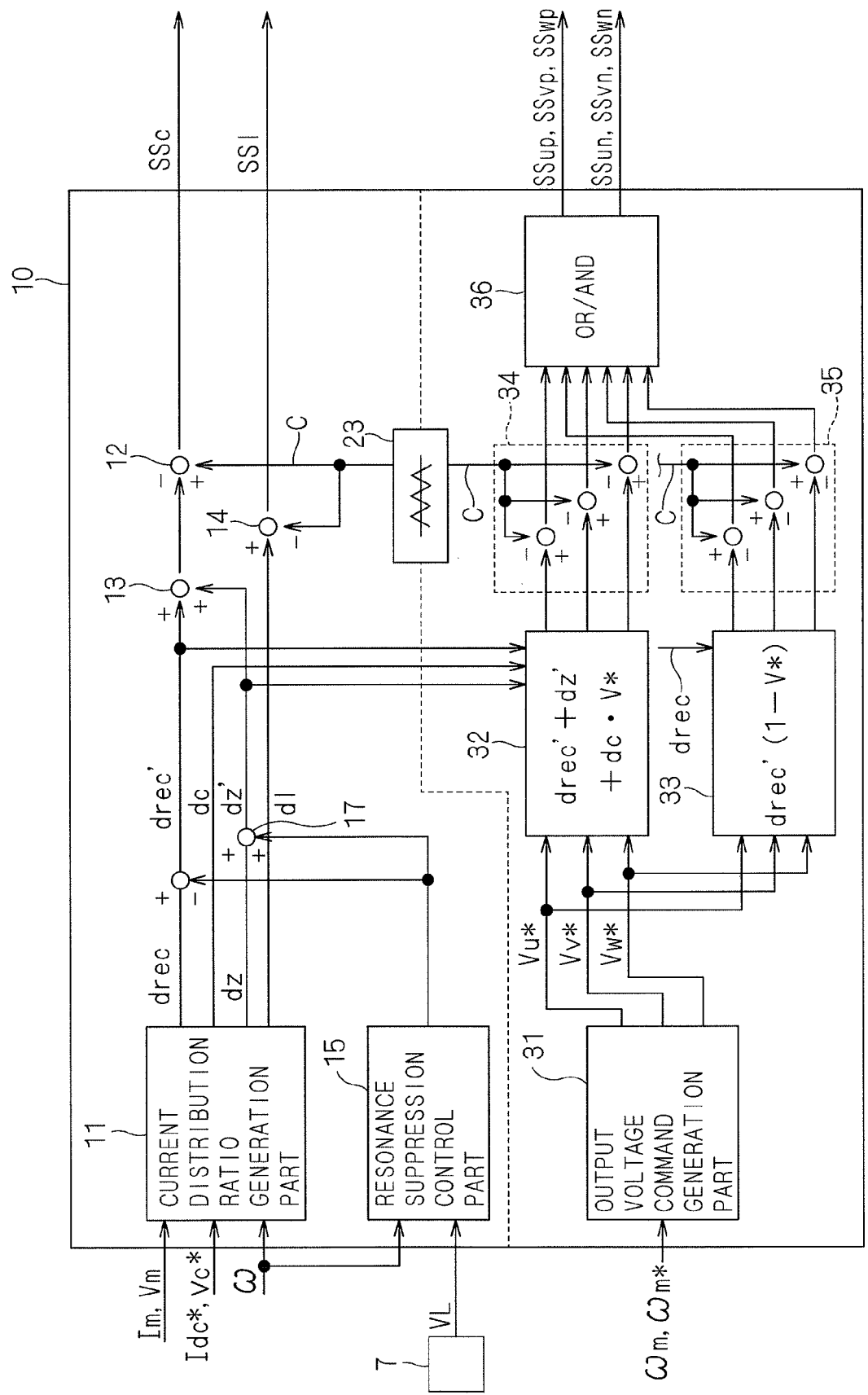
FIG. 19 is a diagram showing one example of a conceptual configuration of a control part.

FIG. 19 shows one example of a conceptual configuration of a control part 10 for controlling the present direct power conversion device. The control part 10 is provided with a current distribution ratio generation part 11, a resonance suppression control part 15, a subtraction part 16, addition parts 13, 17, comparison parts 12, 14, a carrier generation part 23, an output voltage command generation part 31, operation parts 32, 33, comparison parts 34, 35, and OR/AND operation part 36.

The current distribution ratio generation part 11 receives inputs of the amplitude Vm of the simple-phase AC voltage Vin, the amplitude Im of the input current Iin, a command value Idc* concerning the DC current Idc, a command value vc* concerning the voltage vc between both ends, and the power supply angular velocity co. For example, by providing a known detection part, the amplitudes Vm, Im and the power supply angular velocity co are detected and inputted into the current distribution ratio generation part 11. The command values Idc*, vc* are inputted from an external part, not shown.

In the giving period T1, the current distribution ratio generation part 11 respectively outputs the rectification duty drec and the discharge duty de based on Expressions (6) and (7) and outputs zero as the boost duty dl, and in the receiving period T2, the current distribution ratio generation part 11 respectively outputs the rectification duty drec and the discharge duty dc based on Expressions (10) and (16) and outputs zero as the discharge duty dc. Further, the current distribution ratio generation part 11 outputs as the zero duty dz a value obtained by subtracting a sum of the rectification duty drec and the discharge duty de from 1.

The resonance suppression control part 15 receives an input of the voltage VL of the reactor L3. The voltage VL is detected by a known voltage detection part 7. The larger the voltage VL is, the larger correction value the resonance suppression control part 15 outputs. For example, a product of the voltage VL and the predetermined value K is outputted as a correction value.

Further, in the illustration of FIG. 19, for example, the power supply angular velocity ω is inputted into the resonance suppression control part 15. In the giving period T1 found by a product w·t of the power supply angular velocity w and the time t, the larger the voltage VL, the larger correction value the resonance suppression control part 15 may output, and in the receiving period T2, the resonance suppression control part 15 may output zero as the correction value.

The subtraction part 16 receives inputs of the rectification duty drec and the correction value, subtracts the correction value from the rectification duty drec, and outputs a result thereof as the post-correction rectification duty drec'.

The addition part 17 receives inputs of the zero duty dz and the correction value, adds these, and outputs it as the post-correction zero duty dz'. Hence the post-correction zero duty dz' becomes a value obtained by subtracting a sum of the post-correction rectification duty drec' and the discharge duty de from 1.

The post-correction rectification duty drec' and the post-correction zero duty dz' are added in the addition part 13, and a result thereof (drec'+dz') is compared with the carrier C in the comparison part 12. The carrier C is, for example, generated in the carrier generation part 23. A result of the comparison in the comparison part 12 is outputted as a switching signal SSc that is given to the switch Sc. For example, the comparison part 12 outputs as the switching signal SSc a signal activated in a period when the carrier C is not smaller than a value (drec'+dz').

The boost duty dl is compared with the carrier C in the comparison part 14, and a result of the comparison is outputted as a switching signal SS1 that is given to the switch S1. For example, the comparison part 14 outputs as the switching signal SS1 a signal activated in a period when the carrier C is not larger than the boost duty dl.

The output voltage command generation part 31 generates the phase voltage commands Vu*, Vv*, Vw*. In the illustration of FIG. 19, the output voltage command generation part 31 receives inputs of a rotational velocity ωm of the inductive load 6 and its command ωm*. The rotational velocity ωm is detected by a known detection part, and the command ωm* is inputted by an external part, not shown. The output voltage command generation part 31 generates the phase voltage commands Vu*, Vv*, Vw* by a known technique such that a deviation of the rotational velocity corn and its command ωm* is reduced.

The operation part 32 receives inputs of the post-correction rectification duty drec', the post-correction zero duty dz', the discharge duty de and the phase voltage commands Vu*, Vv*, Vw*. The operation part 32 calculates a value (drec'+dz'+dc·Vx*) (where x represents u, v, w), and outputs these. The operation part 33 receives inputs of the post-correction rectification duty drec' and the phase voltage commands Vu*, Vv*, Vw*, calculates values (drec'·(1−Vx*)), and outputs these.

The value (drec'+dz'+dc·Vx*) is compared with the carrier C in the comparison part 34, and the value (drec'·(1−Vx*)) is compared with the carrier C in the comparison part 35. The comparison part 34, for example, outputs a signal activated in a period when the carrier C is not smaller than the value (drec'+dz'+dc·Vx*), and the comparison part 35, for example, outputs a signal activated in a period when the carrier C is not larger than the value (drec'·(1−Vx*)).

Comparison results of the comparison parts 34, 35 are inputted into the OR/AND operation part 36. ORs of the comparison results of the comparison parts 34, 35 are outputted as switching signals SSup, SSvp, SSwp that are respectively given to the switching elements Sup, Svp, Swp, and NORs of these are outputted as switching signals SSun, SSvn, SSwn that are respectively given to the switching elements Sun, Svn, Swn.

Fourth Embodiment

A configuration of the direct power conversion device according to a fourth embodiment is the same as the direct power conversion device according to the second embodiment. Here, there will be described a method of suppressing the advance of the input current Iin by setting a constant of the filter 3, to reduce the resonance frequency component. The inductance of the reactor L3 and the capacitance of the capacitor C3 can be set based on a design method shown in Chapter III-A of Yoshiya Ohnuma, Jun-ichi Itoh, "Comparison of Boost Chopper and Active Buffer as Single to Three Phase Converter, IEEE ECCE 2011, pp. 515-521 (2011). For example, when 230 [V] is adopted as an effective value of the AC voltage Vin and 16 [A] is adopted as an effective value of the input current Iin for input conditions of the AC power supply 1 for inputs into the diode rectifier 2, a constant shown in a field J of Table 1 is set.

TABLE 1

|  | J | A | B |
| --- | --- | --- | --- |
| L (μH) | 460 | 820 | 950 |
| C (μF) | 25 | 14 | 12 |
| % L | 1.0% | 1.8% | 2.1% |
| fc (kHz) | 1.48 | 1.49 | 1.49 |
| Rated power factor | 99.4% | 99.8% | 99.9% |
| Phase advancing time | 352.2 μsec | 197 μsec | 169.5 μsec |
| Load with power factor of 85% | 18% | 10% | 9% |

Here, % L is a ratio (=Z/ωL, ω is a power supply angular velocity) of an inductive reactance of the reactor L3 with respect to a rated impedance Z of the diode rectifier 2, and fc is a cutoff frequency of the filter 3.

In this case, phase advancing time At (one obtained by dividing the phase difference by the power supply angular velocity co) for the input current Iin with respect to the AC voltage Vin is 352.2 [μsec], and a rated input power factor is 99.4%. Further, a load at the time of the power factor having a lower limit of 85%, which is shown in the Indoor wiring regulations, is 18% of the rated value. Therefore, when such a filter 3 is adopted, in a conditioning inverter whose capacity variable range is on the order of 10:1, a power factor can be below 85%. It is not desirable that the power is below 85% as described above.

A field A of Table 1 shows a result of finding a constant such that the power factor becomes not smaller than 85% when the load is 10% of the rated value. According to such a constant, the capacitance of the capacitor C3 becomes small, thereby allowing reduction in phase advancing time for the input current Iin with respect to the AC voltage. FIG. 20 shows the AC voltage Vin in its upper portion, and shows current waveforms in the case of adopting the constant shown in the field A by resistance value of the resistor R3. The input current Iin when the resistance value of the resistor R3 is 20 [Ω] is shown in a portion below the AC voltage Vin of FIG. 20, and the input current Iin when the resistance value is 200 [Ω] is shown in the lowest portion of FIG. 20. It is to be noted that the attenuation factor when the resistance value is 20 [Ω] is about 0.19, and the attenuation factor when the resistance value is 200 [Ω] is about 0.02.

Since the capacitance of the capacitor C3 in FIG. 20 is 15 [μF] as shown in the field A of Table 1 and the capacitance of the capacitor C3 in FIG. 11 is 25 [μF] as shown in the field J of Table 1, the phase advancing time t10 becomes short as compared to FIG. 11. Hence the value v0 of the AC voltage Vin at the time point t1 when the input current Iin becomes zero can be reduced as compared to FIG. 11. This leads to reduction in minimum value of the voltage vc between both ends of the capacitor C3. When the minimum value of the voltage vc between both ends is reduced, the period t20 from zero of the input current Iin to the restart of flow thereof becomes small. Hence it is possible to reduce an initial variation width when the input current Iin restarts to flow, and further to make the amplitude of the filter resonance waveform small.

Though the phase advancing time t10 can further be reduced by setting the capacitance of the capacitor C3 further smaller, even when the phase advancing time t10 is made as long as or shorter than the carrier cycle, the minimum value of the voltage vc between both ends of the capacitor C3 cannot be lowered because of a variation principle of distributing a current as synchronizing a current source subjected to PWM modulation with the carrier in the carrier cycle, and a non-flowing period is generated in the vicinity of a zero cross of the input current Iin. A field B of Table 1 shows a lower limit value of the circuit constant with a carrier frequency of 5.9 [kHz] (about a carrier cycle of 169.5 [μsec]). In this case, the phase advancing time T10 is almost the same as the carrier cycle.

In other words, it is desirable to take the capacitance of the capacitor C3, with which the phase advancing time t10 becomes almost the same as the carrier cycle, as the lower limit value concerning the capacitance of the capacitor C3.

FIG. 21 shows current waveforms in the case of adopting the constant shown in the field B by resistance value of the resistor R3. The input current Iin at the time of the resistance value of the resistor R3 being 20 [Ω] is shown in the upper portion of FIG. 21, and the input current Iin at the time of the resistance value being 200 [Ω] is shown in the lower portion of FIG. 21. It is to be noted that the attenuation factor at the time of the resistance value being 20 [Ω] is about 0.22, and the attenuation factor at the time of the resistance value being 200 [Ω] is about 0.02. The larger the resistance value of the resistor R3, the more the resonance frequency component of the input current Iin increases. However, since the capacitance of the capacitor C3 further becomes smaller, the phase advancing time t10 further becomes shorter, and the resonance frequency component is small as compared to that shown in FIG. 20.

The present disclosure has been described in detail, but the above descriptions are illustrative in all aspects, and the present disclosure is not restricted thereto. It is understood that a countless number of unillustrated modified examples can be conceived without deviating from the scope of the present disclosure.

The invention claimed is:

1. A direct power conversion device, comprising:
a first power supply line;
a second power supply line applied with a potential lower than that of said first power supply line;
a diode rectifier which has an input side connected with a single-phase AC power supply and an output side connected with said first power supply line and said second power supply line, and performs a single-phase full-wave rectification;
a first capacitor provided between said first power supply line and said second power supply line;
a charge/discharge circuit provided between said first power supply line and said second power supply line on a side opposite to said diode rectifier with respect to said first capacitor; and
an inverter inputted with a DC voltage as a voltage between said first power supply line and said second power supply line,
wherein said charge/discharge circuit has
a buffer circuit including a second capacitor provided between said first power supply line and said second power supply line and a first switch connected in series to said second capacitor on a side of said first power supply line between said first power supply line and said second power supply line,
a booster circuit which boosts a rectified voltage from said diode rectifier to charge said second capacitor, and
a current blocking part provided on said first power supply line or said second power supply line between said first capacitor and said second capacitor and blocks flowing of a current from said second capacitor to said first capacitor.

2. The direct power conversion device according to claim 1, wherein said current blocking part is a diode.

3. The direct power conversion device according to claim 2, wherein
said booster circuit includes
a second diode provided with an anode and a cathode connected between said first switch and said second capacitor,
a reactor connected between said first power supply line and said anode, and
a second switch connected between said second power supply line and said anode, and
said diode is provided on said first power supply line between said buffer circuit and said booster circuit.

4. The direct power conversion device according to claim 1, further comprising
a second reactor provided on said first power supply line or said second power supply line between said first capacitor and said diode rectifier.

5. The direct power conversion device according to claim 1, further comprising
a second reactor provided on said input side of said diode rectifier.

6. The direct power conversion device according to claim 4, further comprising
a damping resistor connected in parallel to said second reactor.

7. The direct power conversion device according to claim 5, further comprising
a damping resistor connected in parallel to said second reactor.

8. A method for controlling the direct power conversion device according to claim 4, the method comprising:
detecting a voltage of said second reactor;
generating a rectification duty as a time ratio where said diode rectifier is conducted;
correcting said rectification duty so as to be reduced more as said voltage is larger, to generate a post-correction rectification duty; and
controlling a zero-phase current of said inverter by use of a zero duty as a time ratio that is set based on said post-correction rectification duty and a discharge duty as a time ratio where said first switch is conducted.

9. The method for controlling the direct power conversion device according to claim 8, wherein said rectification duty is corrected only in a first period when a cosine value with respect to a value twice as large as a phase angle of an AC waveform outputted by said single-phase AC power supply under grasping the AC waveform as a sine value of the phase angle.

10. A method for controlling the direct power conversion device according to claim 5, the method comprising:
detecting a voltage of said second reactor;
generating a rectification duty as a time ratio where said diode rectifier is conducted;
correcting said rectification duty so as to be reduced more as said voltage is larger, to generate a post-correction rectification duty; and
controlling a zero-phase current of said inverter by use of a zero duty as a time ratio that is set based on said post-correction rectification duty and a discharge duty as a time ratio where said first switch is conducted.

11. The method for controlling the direct power conversion device according to claim 10, wherein said rectification duty is corrected only in a first period when a cosine value with respect to a value twice as large as a phase angle of an AC waveform outputted by said single-phase AC power supply under grasping the AC waveform as a sine value of the phase angle.

12. A method for controlling the direct power conversion device according to claim 6, the method comprising:
   detecting a voltage of said second reactor;
   generating a rectification duty as a time ratio where said diode rectifier is conducted;
   correcting said rectification duty so as to be reduced more as said voltage is larger, to generate a post-correction rectification duty; and
   controlling a zero-phase current of said inverter by use of a zero duty as a time ratio that is set based on said post-correction rectification duty and a discharge duty as a time ratio where said first switch is conducted.

13. The method for controlling the direct power conversion device according to claim 12, wherein said rectification duty is corrected only in a first period when a cosine value with respect to a value twice as large as a phase angle of an AC waveform outputted by said single-phase AC power supply under grasping the AC waveform as a sine value of the phase angle.

14. A method for controlling the direct power conversion device according to claim 7, the method comprising:
   detecting a voltage of said second reactor;
   generating a rectification duty as a time ratio where said diode rectifier is conducted;
   correcting said rectification duty so as to be reduced more as said voltage is larger, to generate a post-correction rectification duty; and
   controlling a zero-phase current of said inverter by use of a zero duty as a time ratio that is set based on said post-correction rectification duty and a discharge duty as a time ratio where said first switch is conducted.

15. The method for controlling the direct power conversion device according to claim 14, wherein said rectification duty is corrected only in a first period when a cosine value with respect to a value twice as large as a phase angle of an AC waveform outputted by said single-phase AC power supply under grasping the AC waveform as a sine value of the phase angle.

* * * * *